United States Patent
Ganger et al.

(10) Patent No.: US 11,817,701 B2
(45) Date of Patent: Nov. 14, 2023

(54) MULTI-PORT SPLIT-PHASE POWER SYSTEM

(71) Applicant: EATON INTELLIGENT POWER LIMITED, Dublin (IE)

(72) Inventors: David W. Ganger, Lakewood, CO (US); Vijay Bhavaraju, Arvada, CO (US); Kathleen M. Romans, Denver, CO (US); Sandy Jimenez, Coraopolis, PA (US); Marzieh Karami, Milwaukee, WI (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 352 days.

(21) Appl. No.: 17/162,196

(22) Filed: Jan. 29, 2021

(65) Prior Publication Data
US 2022/0247175 A1    Aug. 4, 2022

(51) Int. Cl.
*H02J 3/00* (2006.01)
*G05B 9/02* (2006.01)
(Continued)

(52) U.S. Cl.
CPC .............. *H02J 3/0012* (2020.01); *G05B 9/02* (2013.01); *H02J 3/388* (2020.01); *H02J 13/00002* (2020.01)

(58) Field of Classification Search
CPC .... H02J 3/0012; H02J 3/388; H02J 13/00002; H02J 2300/24; H02J 1/08; H02J 7/35; H02J 4/00; G05B 9/02
See application file for complete search history.

(56) References Cited

U.S. PATENT DOCUMENTS

| RE43,572 E | 8/2012 | West |
| 8,466,662 B2 | 6/2013 | Nania et al. |

(Continued)

FOREIGN PATENT DOCUMENTS

| CN | 103199699 A | 7/2013 |
| CN | 102290999 A | 12/2013 |

(Continued)

OTHER PUBLICATIONS

"Understanding Your Home's Main Circuit Breaker, Mar. 28, 2019, Happyhiller, https://happyhiller.com/blog/understanding-your-homes-main-circuit-breaker/#:~:text=The%20main%20breaker%20is%20designed,directly%20to%20these%20two%20wires.", (Year: 2019).*

(Continued)

*Primary Examiner* — Santosh R Poudel
(74) *Attorney, Agent, or Firm* — Eckert Seamans Cherin & Mellott, LLC

(57) ABSTRACT

A multi-port split-phase power system that includes a control panel including a plurality of breakers, a multi-port converter including an AC port coupled to a second breaker, a DC port coupled to a DC energy source device, and galvanically isolated converters coupled to the AC port and DC port, where the AC port includes a first line, a second line, and a neutral and structured to supply, from the AC energy source device during islanded mode, at least one of 240V to the load device via the first line and the second line or 120V to the load device via the first line and the neutral, and an energy management system including a software for controlling the plurality of breakers, the energy management system structured to perform islanding, reconnection to the utility, and interlocking of the plurality of breakers during the islanding.

22 Claims, 17 Drawing Sheets

(51) Int. Cl.
*H02J 3/38* (2006.01)
*H02J 13/00* (2006.01)

(56) References Cited

U.S. PATENT DOCUMENTS

| | | | | |
|---|---|---|---|---|
| 9,035,782 | B1* | 5/2015 | Flegel | H02H 3/165 |
| | | | | 307/64 |
| 9,484,826 | B2 | 11/2016 | Lin et al. | |
| 9,520,764 | B1* | 12/2016 | Bundschuh | H02M 1/08 |
| 9,796,279 | B2 | 10/2017 | Moribe et al. | |
| 10,536,008 | B2 | 1/2020 | Toya et al. | |
| 2007/0136766 | A1* | 6/2007 | Iwamura | H04B 3/56 |
| | | | | 307/3 |
| 2008/0258557 | A1* | 10/2008 | Lathrop | H02J 3/14 |
| | | | | 307/25 |
| 2009/0027932 | A1* | 1/2009 | Haines | H02J 3/46 |
| | | | | 363/95 |
| 2011/0006600 | A1* | 1/2011 | Fontana | H02J 1/10 |
| | | | | 361/679.01 |
| 2013/0134935 | A1 | 5/2013 | Maitra et al. | |
| 2014/0088780 | A1* | 3/2014 | Chen | G05F 1/66 |
| | | | | 700/295 |
| 2014/0257583 | A1 | 9/2014 | Wada et al. | |
| 2015/0183330 | A1 | 7/2015 | Rajagopalan et al. | |
| 2016/0107533 | A1 | 4/2016 | Cai et al. | |
| 2016/0111918 | A1 | 4/2016 | Benson | |
| 2017/0005473 | A1* | 1/2017 | Somani | H02J 3/381 |
| 2017/0149248 | A1* | 5/2017 | Della Sera | H02M 7/537 |
| 2018/0201142 | A1* | 7/2018 | Galin | B60L 53/57 |
| 2018/0219381 | A1 | 8/2018 | Laval et al. | |
| 2018/0269013 | A1 | 9/2018 | Thompson et al. | |

FOREIGN PATENT DOCUMENTS

| | | |
|---|---|---|
| CN | 106787923 A | 5/2017 |
| CN | 107493017 A | 12/2017 |
| CN | 108258676 A | 7/2018 |
| CN | 108306281 A | 7/2018 |
| CN | 106374451 B | 12/2018 |
| CN | 109347343 A | 2/2019 |
| CN | 105391301 A | 3/2019 |
| CN | 110120758 A | 8/2019 |
| CN | 209448659 U | 9/2019 |
| CN | 107947679 A | 11/2019 |
| CN | 107911024 A | 12/2019 |
| CN | 107947572 B | 12/2019 |
| CN | 110739855 A | 1/2020 |
| CN | 110829841 A | 2/2020 |
| CN | 210327401 U | 4/2020 |
| CN | 210431234 U | 4/2020 |
| CN | 110299862 B | 11/2020 |
| EP | 3189572 A1 | 7/2017 |
| JP | WO2016017018 A1 | 4/2017 |
| WO | 2016/036419 A1 | 3/2016 |
| WO | 2020/169018 A1 | 8/2020 |
| WO | 2020/181384 A1 | 9/2020 |

OTHER PUBLICATIONS

"Tony R. Kuphaldt, Nov. 6, 2021, Chapter 10, Polyphase AC Circuits, https://www.ibiblio.org/kuphaldt/electricCircuits/AC/AC_10.html" (Year: 2021).*

* cited by examiner

MULTI-PORT SPLIT-PHASE POWER SYSTEM

BACKGROUND

Field

The disclosed concept relates generally to a power system, and in particular, to a split-phase power system with multi-port power electronics to connect sources and loads.

Background Information

Solar energy, or photovoltaic (PV) systems coupled with energy storage systems have increasingly become an alternative to diesel generators for back-up power for single-family residences, multi-family residences, or small commercial or industrial businesses. As electric vehicles (EVs) increase in popularity, EV chargers will become commonplace at these locations with the opportunity to leverage the EV as backup power as well. These PV inverters, EV chargers, and energy storage battery inverters are each connected to an electrical main panel, which interfaces with the residential and/or commercial electric grid and draws power from this connection to power normal loads and to charge vehicles or batteries. When in use as a backup power system, if a power outage occurs the PV/battery/EV system must provide energy to at least critical loads (e.g., HVAC system, furnace, fans, etc.) by islanding the building. The islanding can be planned for ensuring power reliability or unplanned as a result of a power outage. For example, during a power outage, the residential or commercial power system may establish an island in which any of the PV, EV battery, or energy storage system may supply power to the loads while disconnected from the utility. Each of the PV arrays, EVs, or energy storage batteries have a separate box for connection to the power system and electric grid. Each box includes a separate converter (e.g., an AC/DC converter, a DC/AC converter), and a separate connection port. Further, some AC loads require 240Vac (e.g., an HVAC system) while others require 120V (e.g., a refrigerator). However, powering a 240V split-phase system (L1, N, L2) with a line-to-line energy source device that has only L1 and L2 and no neutral e.g., a bidirectional capable AC electric vehicle charger connected to an EV does not have the ability to provide power to 120V loads. In fact, the line-to-line only energy source device simply cannot be used as an alternative or back-up energy source since it cannot provide a neutral connection to 120V loads or sources during an islanded operation.

There is room for improvement in alternative or back-up power supply system, particularly during islanded operation.

SUMMARY

These needs and others are met by embodiments of the disclosed concept in which a multi-port split-phase power system is provided.

In accordance with one aspect of the disclosed concept, a multi-port split-phase power system for supplying power to a load device in an electric power system includes: a control panel comprising a plurality of breakers including a first breaker connected to the utility, a second breaker, a third breaker coupled to an alternating current (AC) energy source device, and a fourth breaker coupled to the load device; a multi-port converter comprising an AC port coupled to the second breaker, a DC port coupled to a DC energy source device, and galvanically isolated converters between the AC port and DC port, where the AC port comprises a first line (L1), a second line (L2), and a neutral and structured to supply, from the AC energy source port during islanding, at least one of 240V to the load device via the first line and the second line or 120V to the load device via the first line and the neutral; and an energy management system comprising of software configured to control the plurality of breakers, the energy management system structured to perform islanding, reconnection to the utility, and interlocking of the plurality of breakers during the islanding.

Another embodiment provides a method for an unplanned islanding using a multi-port split-phase power system. The method includes: determining that utility voltage and frequency are outside of user-defined limits; sending a first command to a grid-forming energy source device and a controllable load device to stop from importing or exporting power; opening all breakers of a plurality of breakers within the multi-port split-phase power system and implement a lockout, the plurality of breakers are controllable by a software stored within an energy management system of the multi-port split-phase power system, wherein the lockout comprises holding a first breaker coupled to utility open; sending a second command to the grid-forming energy source devices to energize; closing a second breaker coupled to the grid-forming energy source devices; determining that source voltage and frequency at the grid-forming energy source devices are within the user-defined limits; closing a third breaker coupled to critical loads; and determining that system voltage and frequency are within the user-defined limits.

Another embodiment provides for a method for unplanned reconnection to an electric grid using a multi-port split-phase power system. The method includes: determining that utility voltage and frequency are within user-defined limits; waiting a predefined period; determining that the utility voltage and frequency stayed consistently within the user-defined limits during the predefined period; sending a command to all grid-forming energy source devices to stop exporting power to the multi-port split-phase power system; determining that system voltage and frequency are at 0% within the multi-port split-phase power system; releasing a lockout on a first breaker coupled to utility and opening all breakers within the multi-port split-phase power system; closing the first breaker coupled to the utility; and determining that the system voltage and frequency are within the user-defined limits.

Another embodiment provides for a method for seamless islanding using a multi-port split-phase power system. The method includes: determining that an energy management system has received an islanding command or has determined that an economical or reliability goal can be achieved by islanding; sending a command to a grid-forming energy source device to export power to the multi-port split-phase power system; zeroing the power for utility connection; opening a first breaker coupled to utility; and determining that system voltage and frequency are within user-defined limits.

Another embodiment provides for a method for seamless reconnection to an electric grid using a multi-port split-phase power system. The method includes: determining that an energy management system of the multi-port split-phase power system has received a reconnection command; determining that utility voltage and frequency are within user-defined limits; synchronizing an AC port of the multi-port split-phase power system to the utility voltage and frequency; closing a first breaker coupled to utility; and determining that the utility voltage and frequency and system voltage and frequency are within the user-defined limits.

BRIEF DESCRIPTION OF THE DRAWINGS

A full understanding of the disclosed concept can be gained from the following description of the preferred embodiments when read in conjunction with the accompanying drawings in which:

FIG. 1A is a schematic diagram of a utility in accordance with an example embodiment of the disclosed concept;

DESCRIPTION OF THE PREFERRED EMBODIMENTS

Figure 1:
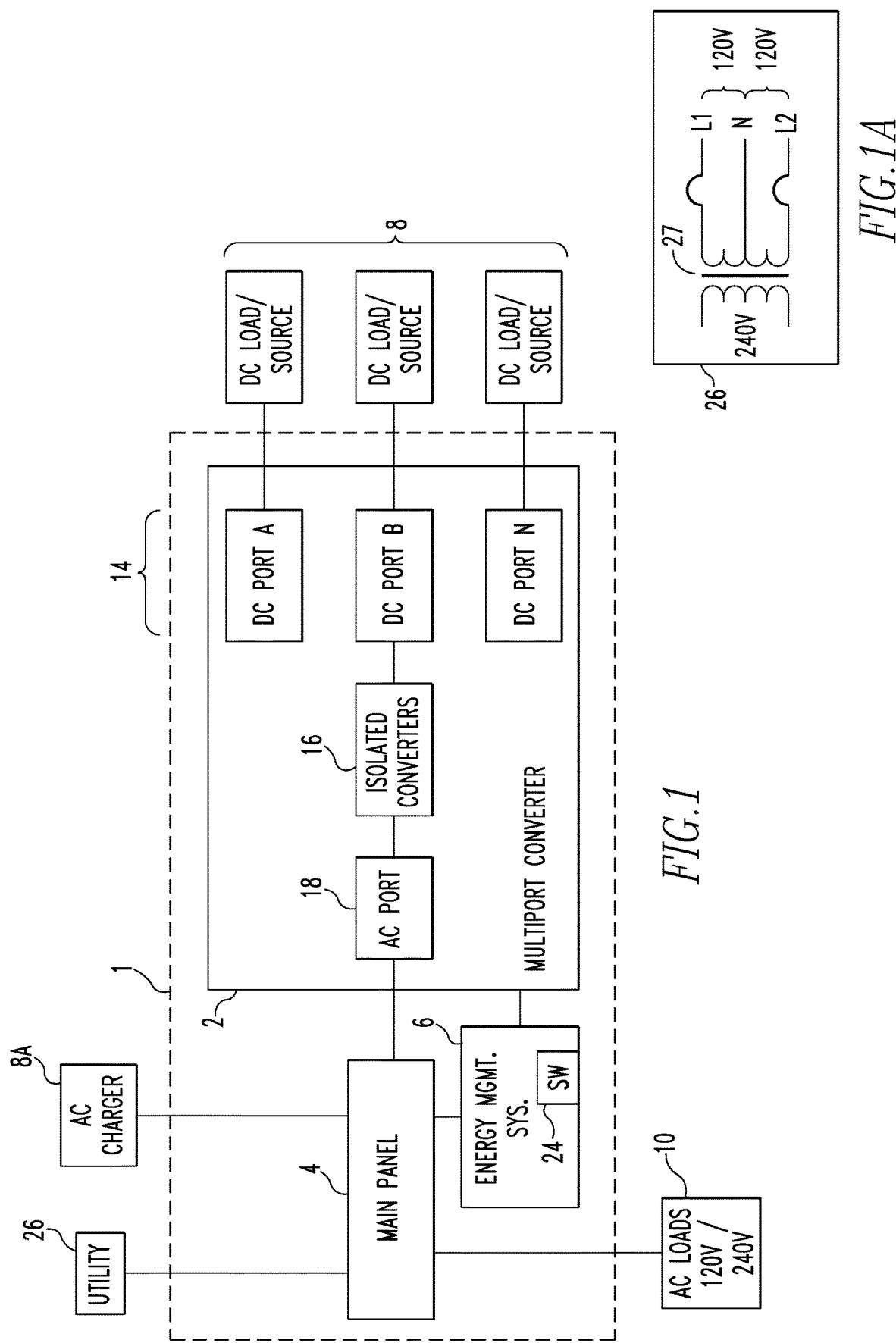
FIG. 1 is a block diagram of a multi-port split-phase power system in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

Recently, PV, EVs and energy storage batteries have increasingly become alternatives for back-up energy sources for one or more load devices for a residential or small commercial power system, e.g., during an islanded mode in which they are disconnected from the utility. The islanding may be planned for ensuring power reliability or economic purposes, or unplanned due to, e.g., a power outage. The economic purposes may be associated with returning to and taking power from the electric grid, and include demand response services (monetary returns from the utility for providing power from the energy source device), load shedding, peak shaving, etc. However, each of these energy source devices (e.g., PV, EV, energy storage batteries) has an interface for connecting to the electric grid, requiring a separate box including a separate converter and a port for connection to the electric grid. The multi-port split-phase power system in accordance with the present disclosure integrates the separate boxes into one multi-port converter and provides a minimal number of ports and converters for connecting the chargers and batteries to the grid. Further, the multi-port split-phase power system includes an energy management system having a software configured to control a plurality of breakers in a control panel. The software can be communicatively coupled to a user device (e.g., a mobile device) via which a user may select which energy source device will power which load device. As such, the multi-port split-phase power system provides alternative for back-up energy from any of these resources based on a user preference (e.g., a user may decide to power their dishwasher with their EV [via the AC charger port] or with their standalone battery storage system). Additionally, the multi-port split-phase power system includes an AC port which has not only the two 120V lines in a conventional 240V split-phase power system, but also a neutral which provides a different voltage, thereby allowing an AC phase-to-phase energy source device such as an EV to provide power to 120V load devices as well as 240V load devices. Without the neutral, such AC vehicle-to-home (V2H) power supply system will not function. By introducing the neutral in an AC port, the multi-port split-phase power system not only makes an AC V2H power supply system possible, but also allows the EV to be a sole power source for all loads coupled to the grid since the EV can provide power to both 120V load devices and 240V load devices. Moreover, the multi-port split-phase power system enhances the effectiveness of islanding by utilizing an interlocking system in which the energy management system interlocks all breakers coupled to the energy source devices and the load devices as well as a breaker coupled to the utility. As such, the multi-port split-phase power system opens all breakers during the initiation of islanding mode and locks out the breaker coupled to the utility throughout the islanded operation, thereby ensuring only the devices that are supposed to be connected to the split-phase power system are connected to the island, and if applicable, other devices remain connected to the grid. For example, the non-critical loads (e.g., a TV 28) coupled to the main panel may remain connected to the grid during islanded mode. Finally, the multi-port split-phase power system can enable seamless islanding of the V2H system. For conventional power systems there may be an interruption in the power when the power system is switching from the utility to islanded mode. However, intelligence and controls within the inverter can detect if any combination of the EV, PV, and/or energy storage system is fully charged and can support the critical loads. If there is a combination of devices that are fully charged, upon disconnection from the utility the system will be capable of seamlessly supplying power to the load devices during islanding. Specifically, the energy management system (e.g., controller intelligence within the energy management system) of the multi-port split-phase power system may detect back-up source capacity to support home/building loads for seamless islanding.

FIG. 1 is a block diagram of a multi-port split-phase power system 1 in accordance with an example embodiment of the disclosed concept. The multi-port split-phase power system 1 is coupled to energy source devices 8,8A, load devices 10, and utility 26. The energy source devices 8,8A may include AC energy source devices 8A (e.g., AC EV charger) and DC energy source devices 8 (which may also be DC load devices). The energy source devices 8 and 8A may be bidirectional devices, i.e., transfer energy bidirectionally (e.g., from and to the utility 26). For example, during islanded mode the energy source devices 8 and 8A may export power to the load devices 10 to supply power. In another example, when connected to the utility 26, the DC energy source device 8 may import power from the utility 26 for charging or export power to the utility 26. The multi-port split-phase power system 1 may be installed at a single-family residence, multi-family residence, or a small commercial or industrial business.

The multi-port split-phase power system 1 may include a multi-port converter 2, a main panel (e.g., residential or commercial main panel) 4, and an energy management system 6 coupled to the multi-port converter 2 and the main panel 4. The multi-port converter 2 is coupled to the main panel 4, the energy management system 6, and the energy source devices 8 and 8A. The energy source devices 8 and 8A may be referred to as assets to the multi-port split-phase power system 1 and may include DC energy source devices (e.g., EV, EV connected via wireless DC EV charger, PV, energy source battery, smart DC devices, etc.) and the AC energy source device (e.g., EV, EV connected via wireless AC EV charger, smart AC devices, etc.). As such, the multi-port converter 2 connects to the assets and is configured to integrate a plurality of assets with a minimum number of ports and converters, and supply power to the load devices including 120V load devices and 240V load devices.

The multi-port converter 2 may include one or more DC ports 14 for coupling DC energy source devices or DC loads 8 (each of these ports being galvanically isolated), isolated converters 16 for converting voltages from AC to DC, DC to AC or DC to DC, and AC port 18 coupled to the main panel 4 and the isolated converters 16. The DC ports A,B,N (where N is a positive integer) may be interchangeable and software 24 programmed and/or selectable in accordance with a user preference or need. The number of DC ports 14 and their power level may be changed based on a user preference or need. Further, power may be exchanged between the DC ports A,B,N 14. For example, if DC port A is connected to a PV or an EV, the DC port A may provide power to DC port B if the DC port B is connected to an EV. The DC ports 14 may be coupled to a PV, an energy storage system, or an EV. In an example where a PV is coupled to a DC port 14, maximum power point tracking (MPPT) may be performed. The system communicates with the EV for circuit protection and battery management. State of charge management is performed when energy storage is connected. The AC port 18 may include a neutral so that the multi-port split-phase power system 1 may provide backup power solely from the AC charger 8A. For example, the AC port 18 may include line 1 (L1), neutral (N), and line 2 (L2) (as shown in FIGS. 6A-B and 7A-B). L1 and L2 may be coupled to load devices 10 that use 240V to supply 240V. For the load devices 10 using 120V, L1 and N or L2 and N may be coupled to the load devices 10. The energy source devices 8 and 8A and the load devices 10 may be controlled to meet economic objectives of the user.

Figure 3:
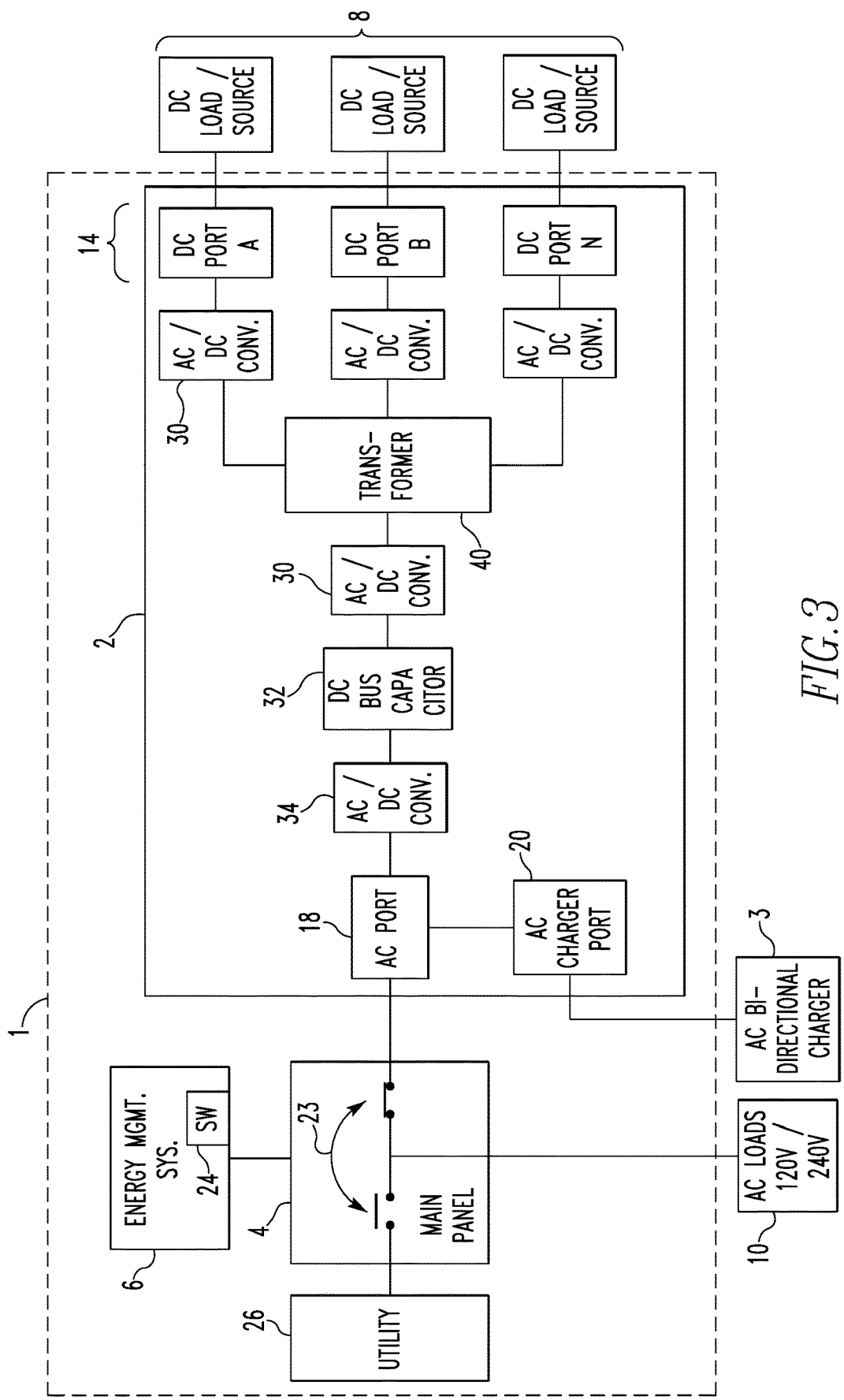
FIG. 3 is a block diagram of a multi-port split-phase power system in accordance with an example embodiment of the disclosed concept.
Figure 4:
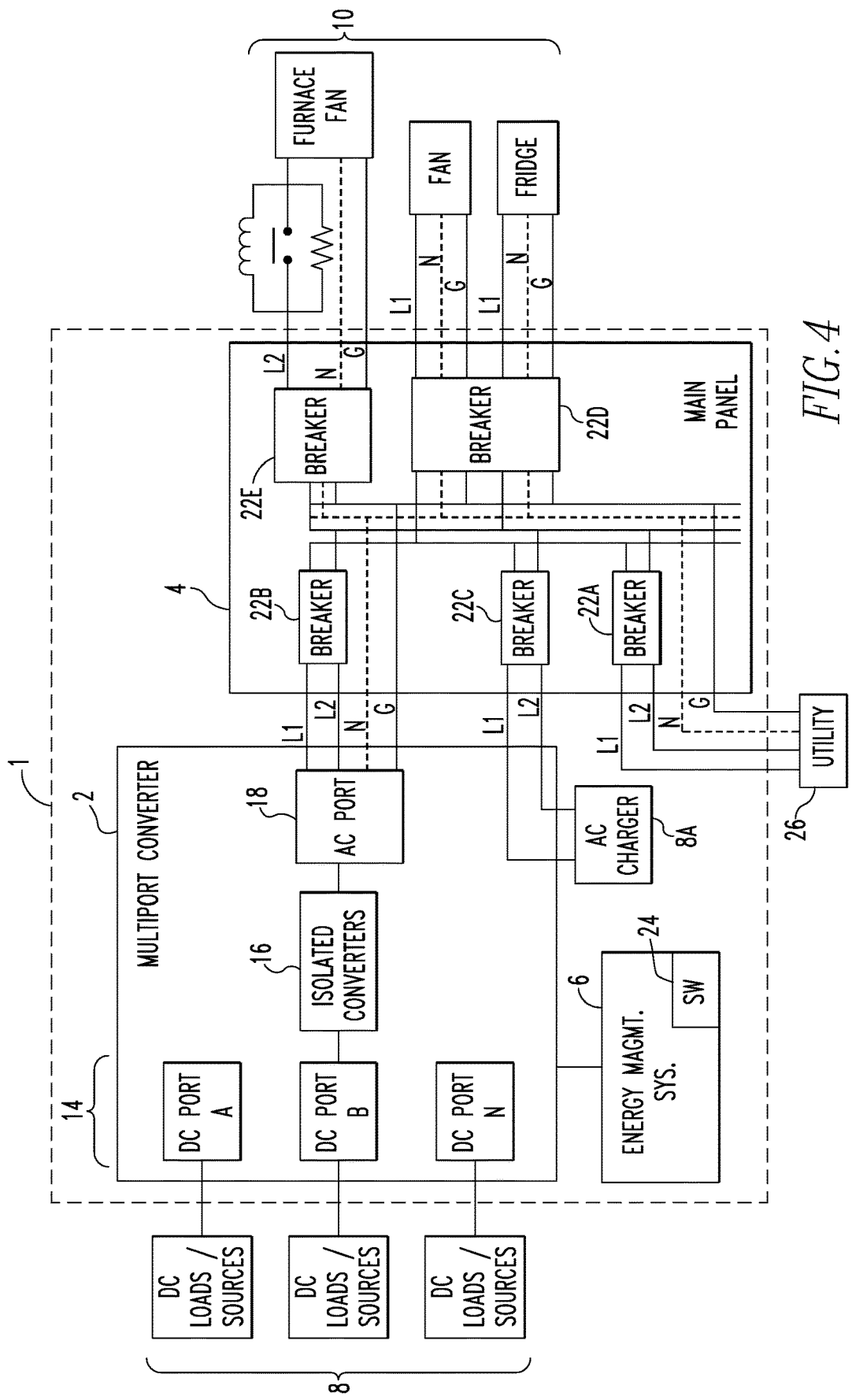
FIG. 4 is a schematic diagram of a multi-port split-phase power system in accordance with an example embodiment of the disclosed concept.

The main panel 4 may be coupled to the energy management system 6, the AC charger 8A, AC loads 10, AC port 18, and utility 26. The connection between the main panel 4 and AC charger 8A may include L1, L2, but no N. The connections between the main panel 4 with the AC loads 10, AC port 18, and utility 26 may include L1, L2, and N. The main panel 4 may include one or more breakers (breakers 22A-E, A'-E', and F-G- as shown in FIGS. 3 and 4), e.g., a first breaker (i.e., a utility-facing breaker) coupled to the utility 26, a second breaker coupled to the AC port 18, a third breaker coupled to the AC energy source device 8A, a fourth breaker coupled to the load device 10, etc. The third breaker can be inside the main panel 4, subpanel or the multiport converter 2 (which can be an independent block outside of the main panel). While FIG. 1 does not show breakers coupled to the DC ports and the DC energy source devices 8, the third breaker may include breakers coupling the DC ports and the DC energy source devices 8. It is noted that utility voltage refers to voltage output at the utility 26, system voltage refers to any voltage within the multi-port split-phase power system 1, and source voltage refers to voltage output at the energy source devices 8 and 8A.

During unplanned islanding, the first breaker (utility input) and at least the second breaker (multi-port converter output) are interlocked. That is, upon determination that the utility voltage or frequency is low (e.g., due to power outage), the energy management system 6 sends a command to stop all sources and controllable loads from importing or exporting power; causes all breakers to open and verifies all voltages and frequencies in the multi-port split-phase power system 1 are zero. Upon such verification, the energy management system 6 implements a lockout by holding the first breaker coupled to the utility 26 open. As such, now the utility-facing first breaker and multi-port converter output breakers (e.g., the second and third breakers) are interlocked so that there is no connection that is not supposed to be connected at the inception of islanding. Upon such interlocking of these breakers, the energy management system 6 transmits a command to the energy source devices 8 and 8A to produce power. The energy source devices 8 and 8A may energize immediately if they have the required stored energy for seamless islanding. The energy management system 6 then closes the third and second breakers coupled to the energy source devices 8 and 8A (i.e., grid-forming source breaker). After a predefined period (e.g., 600 milliseconds) the energy management system 6 confirms whether the source voltage and frequency at one or more energy source devices 8 and 8A is at 100%. Upon such confirmation, the energy management system 6 causes the fourth breakers coupled to the load device 10 to close. The energy management system 6 then waits another predefined period (e.g., 600 milliseconds) for the load device 10 to be energized. Upon the lapse of the predefined period, the energy management system 6 determines whether the system voltages are at 100%. If the system voltages are not at 100%, the energy management system 6 opens all breakers and reports failure to energize to, e.g., a utility cloud or local energy tracking system. If the system voltages are at 100%, then the islanding is a success and the load device 10 receives power from the energy source devices 8 and 8A during the islanding.

In some examples, the multi-port split-phase power system 1 may include the main panel 4 and a subpanel 5 (e.g., a subpanel 5 as described with reference to FIGS. 2, 5, 8, and 9). The subpanel 5 is coupled to critical load devices 10 while the main panel 4 is coupled to the utility 26 and non-critical load devices 10. The main panel 4 and the subpanel 5 are coupled by a breaker or two. During interlocking, this breaker coupling main panel 4 and subpanel 5 is also open to ensure that no unnecessary connection is made. In some examples, the multi-port converter 2 may be included within the main panel 4 or the subpanel 5.

The energy management system 6 is coupled to the multi-port converter 2 and the main panel 4. The energy management system 6 may be a controller configured to control the multi-port split-phase power system 1. The controller 6 may include a memory. The energy management system 6 is also coupled to the utility 26 and communicates with the utility 26 for, e.g., receiving commands from the utility 26. The energy management system 6 is structured to perform the islanding, reconnection to the utility 26, interlock and synchronization to the grid. The energy management system 6 is further structured to detect the type of the DC energy source devices 8 connected to the DC ports 14, and to configure each DC port 14 for the DC energy source device 8 that is coupled to. For example, if the DC energy source device 8 is a PV system, then the energy management system 6 performs MPPT (maximum power point tracking). In another example, if the DC energy source device 8 is an EV connected via a DC port, the energy management system 6 may communicate with the EV for optimal charging protocol, protection and battery management. The energy management system 6 may perform state of charge management and protection when an energy storage battery is connected.

The energy management system 6 may include software 24 which controls the islanding process during, e.g., a power outage, and reconnecting to the utility 26. The software 24 may be stored in the memory of the controller 6. The software 24 is communicatively coupled to AC port 18, isolated converters 16, DC ports 14, and DC loads/sources 8 via available communication technologies (e.g., wired, wireless, Bluetooth™ communications technologies, etc.). For islanding, the energy management system 6 as per commands from the software 24 may: (1) determine if utility voltage or frequency is low (e.g., due to a power outage); (2) if yes, send a command to the multi-port converter energy management system to stop all energy source devices 8 and 8A and load device 10 from importing or exporting power from the utility or the multi-port split-phase power system 1, or if no, wait for a period (e.g., 60 milliseconds), take readings, send the reading to a utility cloud or an internal database, and go back to step 1; (3) open all breakers; (4) verify that system voltage is zero; (5) implement a lockout by holding the first breaker coupled to the utility 26; (6) send a command to the energy source devices 8 and 8A to energize; (7) close the second and third breakers coupled to the energy source devices 8,8A; (8) wait a predefined period (e.g., 60 milliseconds) for the energy source devices 8,8A for energization; (9) determine whether the source voltage is at 100%; (10) if no, go back to step 6, or if yes, close the fourth breaker coupled to the load device 10; (11) wait for a predefined period (e.g. 60 milliseconds) for load energization; (12) determine whether the system voltage is at 100%; (13) if yes, islanding is a success, or if no, open all the breakers in the system and report failure to energize. The islanding may be intentional or unintentional. Islanding may be unintentional when whole, partial, or multi-facility backup power must be supplied via islanding during an unplanned utility power outage. Islanding the building may be intentional when the energy management system 1 seeks to ensure power reliability or achieve economic objectives.

For reconnecting to the utility 26, the energy management system 6 as per commands from the software 24 may: (1) determine whether utility voltage and frequency are at 100%; (2) if no, take readings, send the readings to the cloud or an internal database, and determine again whether utility voltage and frequency are at 100%; (3) if yes, upon a lapse of the predefined period of 600 seconds per local standards, determine whether the utility voltage and frequency have stayed consistently at 100%; (4) if yes, send a command to the multiport converter 1 and AC energy source devices 8A to stop all energy source devices 8 and 8A from exporting power to the grid or the multi-port split-phase power system 1, or if no, open all breakers and report failure to energize; (5) determine whether the system voltage is at 0%; (6) if yes, open all breakers or if no, open all breakers and report failure; (7) release a lockout on the first breaker coupled to the utility 26; (8) close the first breaker coupled to the utility 26; (9) determine whether the utility voltage and the system voltage are at 100%; (10) if no, open all breakers and report failure to energize, or if yes, send a synchronization command to the multi-port converter energy management system 6, close all breakers and energize all load device 10; (11) determine the system voltage is at 100%; (12) if yes, reconnection is a success, or if no, open all breakers and report failure to energize. Islanding and reconnection may be seamless or non-seamless. Interlocking system of the multi-port split-phase power system 1 may ensure seamless islanding and reconnection.

DC energy source devices 8 may be, for example, a PV, a battery energy storage system, an EV, an EV connected via a wireless DC EV charger, or a smart DC load device that can also provide energy during islanding. AC Charger 8A may be, e.g., an EV, an EV connected via a wireless AC EV charger, a smart AC load that can also provide energy during islanding. While connected to the utility 26, the energy source devices 8 and 8A may import electricity from the utility 26 for charging or export power to the grid and during islanding the energy source devices 8 and 8A may become an energy source device and export power to the load devices 10. The AC EV charger 8A may be coupled to the AC port 18 which includes a neutral, and be capable of being a sole supplier of power to the load devices 10, because the AC charger 8A may now supply 120V as well as 240V by providing a neutral via the AC port 18.

To sum, the multi-port phase-split power system 1 integrates all connecting elements that require separate boxes for each energy source device into a multi-port converter 2, thereby minimizing several connecting elements and reducing installation costs. Further, the multi-port phase-split power system 1 allows AC phase-to-phase energy source devices 8A to use a neutral such that not only the load devices using 240V but also the devices using 120V may receive power during islanding solely by the AC phase-to-phase energy source devices 8A. Additionally, the multi-port phase split power system 1 provides seamless islanding and seamless reconnection to the utility 26. Moreover, the multi-port split-phase power system 1 also allows a user to control the DC ports and power level and/or select which energy source device to be used for which load device via an application in a mobile device coupled to the software controlling the breakers and other components of the multi-port split-phase power system 1.

FIG. 1A is a schematic diagram of a split-phase system 27 in accordance with an example embodiment of the disclosed concept. Typically, the utility 26 includes the split-phase power system 27 with a transformer, supplying 240V and 120V (via L1 and N, or L2 and N) as shown in FIG. 1A.

Figure 2:
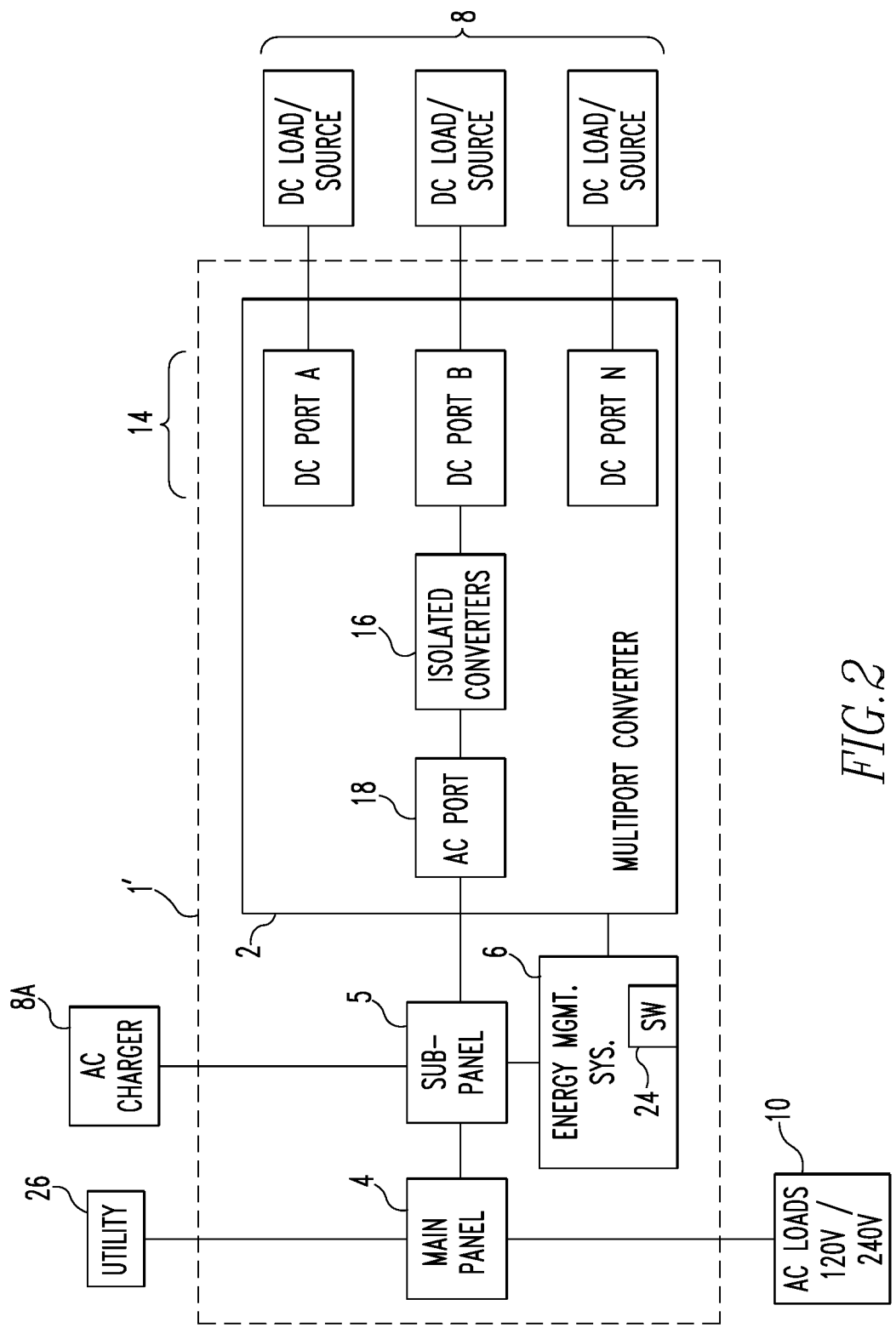
FIG. 2 is a block diagram of a multi-port split-phase power system in accordance with an example embodiment of the disclosed concept.

FIG. 2 is a block diagram of a multi-port split-phase system 1' in accordance with an example embodiment of the disclosed concept. The multi-port split-phase system 1' is similar to the multi-port split-phase system 1 except that it includes a subpanel 5. The subpanel 5 is coupled to the critical load devices 10, the AC charger 3 (can be connected through the AC port 18 of the multi-port converter 2), AC port 18 of the multi-port converter 2 and the energy management system 6. As such, the subpanel 5 allows provision of power to only the critical load devices 10 during islanded mode. In grid-connected mode, the main panel 4 provides power to non-critical load devices and critical load devices (through connection with the subpanel 5). Interlocking by the main panel 4 and subpanel 5 is detailed with reference to the multi-port split-phase power system 1 with reference to FIG. 5.

FIG. 3 is a more detailed block diagram of a multi-port split-phase power system 1 in accordance with an example embodiment of the disclosed concept. The multi-port converter 2 includes one or more DC ports 14, AC port 18, bidirectional DC to split-phase AC converters 34, DC bus capacitor 32, Bidirectional AC to DC converters 30, and high frequency transformer 40. The AC/DC converters 30 coupled to the AC port 18 (which is connected to the system by L1, L2 and N) takes the AC high frequency voltage from AC side and converts the AC voltage to DC voltage. The AC/DC converters 30 coupled to the energy source devices 8 take power from high frequency transformer 40 and converts the high frequency AC voltage to DC voltage The DC bus capacitor 32 provides a more stable DC voltage to the DC/AC converter 34, by limiting fluctuation. The high frequency transformer 40 allows coupling of any DC port 14 to other DC ports 14 and any AC port 18 to other AC ports such as AC bidirectional charger 3. The AC charger port 20 is coupled to the AC bi-directional charger, (connected to e.g. an EV) and allows the AC bidirectional charger 3 to be charged during regular operation or provides power to the AC port 18 to supply voltage to the AC and DC load devices (e.g., AC loads requiring 120V or 240V for operation). All energy source devices 8 and 8A may be bidirectional devices. The main panel 4 includes an interlock 23 which shows that a breaker coupled to the utility 26 and a breaker coupled to the AC port 18 and the load devices 10 are interlocked. That is the breaker coupled to the utility 26 is open (and remains locked out) and the breaker coupled to the AC port 18 is closed. Both of these breakers may be locked out to ensure that all elements of the system are working FIG. 4 is a schematic diagram of a multi-port split-phase power system 1 in accordance with an example embodiment of the disclosed concept. In FIG. 4, the multi-port split-phase power system 1 is coupled to the multi-port converter 2, DC energy source devices 8, AC charger 8A, the load devices 10, and the utility 26. The multi-port converter 2 is coupled to the main panel 4, the energy management system 6, the DC energy source devices 8, and the AC charger 8A. The main panel 4 includes five breakers 22A-E, including a first breaker 22A coupled to the utility 26, a second breaker 22B coupled to the AC port 18, a third breaker 22C coupled to the AC Charger 8A, a fourth breaker 22D and a fifth breaker 22E coupled to the loads 10. The breakers 22A-E may be remotely controlled, e.g., via an app in a mobile device by a user (The restrictions of interlocking between breakers may limit user control of the source breakers). During islanded mode, the first breaker 22A and the second breaker 22B and the third breaker 22C are interlocked (i.e., locked out and open) so that none of the breakers are connected when they are not supposed to (e.g., the first breaker 22A is not connected during islanded mode). The interlocking is essentially between the utility breaker 22A and any other AC sources breakers such as 22B and 22C. That is, interlocking may occur when there are two or more AC sources (e.g., AC charger 8A, AC port 18, and utility 26 in FIG. 4). For example, if AC charger 8A supplies power during islanding, the first breaker 22A and third breaker 22C are interlocked—the first breaker 22A is open and the third breaker 22C is closed. In another example, if AC port 18 supplies power during islanding, the the first breaker 22A and the second breaker 22B are interlocked—the first breaker 22A is open and the second breaker 22B is closed. In yet another example, if the AC charger 8A and the AC port 18 supply power during islanding, the first breaker 22A, the second breaker 22B, and the third breaker 22C are interlocked—the first breaker 22A is open and the second and third breakers 22B,C are closed.

Figure 5:
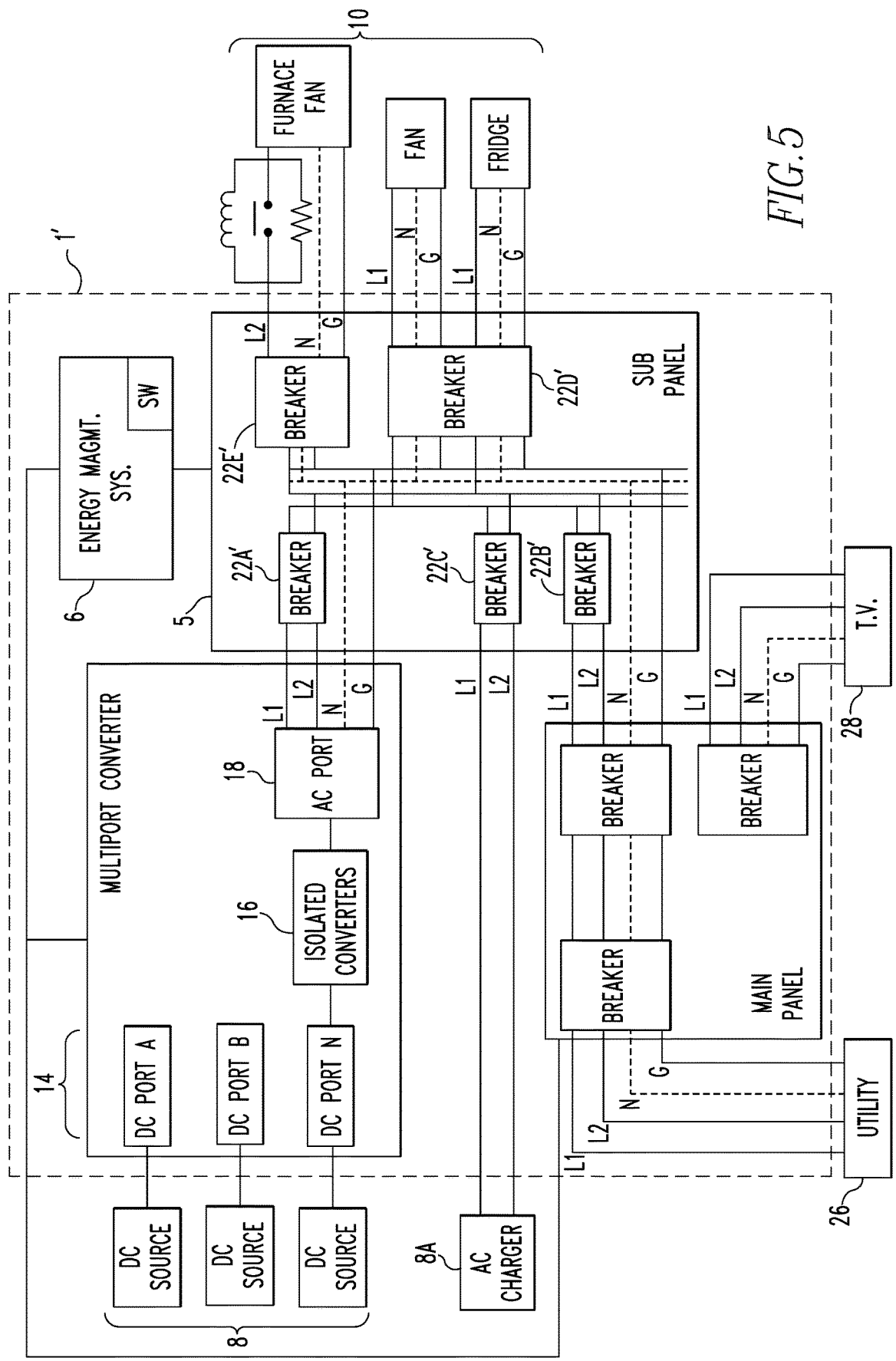
FIG. 5 is a schematic diagram of a multi-port split-phase power system in accordance with an example embodiment of the disclosed concept.

FIG. 5 is a schematic diagram of a multi-port split-phase power system 1' in accordance with an example embodiment of the disclosed concept. The multi-port split-phase power system 1' is coupled to DC source devices 8, AC charger 8A, the load devices 10, and the utility 26. The multi-port split-phase power system 1' is similar to the multi-port split-phase power system 1 as detailed with reference to FIGS. 1 and 4, except that it includes a subpanel 5. The subpanel 5 includes five sets of breakers, a first breaker 22A' coupled to the AC port 18, the second breaker 22B' coupled to a breaker 22F of the main panel 4', the third breaker 22C' coupled to the AC charger 8A, and the fourth and fifth breakers 22D', 22E' coupled to critical load devices (e.g., a furnace fan, a fan, a fridge, etc.) 10. The main panel 4' in turn includes three sets of breakers, a first breaker 22B coupled to the utility 26, a second breaker 22F coupled to the second breaker 22B' of the subpanel 5, and a third breaker 22G coupled to a non-critical load device (e.g., T.V.) 28. During islanded mode or reconnecting to the utility 26, the first breaker 22A' and the second breaker 22B' of the subpanel 5 and the first breaker 22B and the second breaker 22F of the main panel 4' and the third breaker of 22C will interlock (i.e., locked out and open) so that no breaker is connected when they are not supposed to. The second breaker 22B of the main panel 4' remains locked out during islanded mode.

Figure 6A:
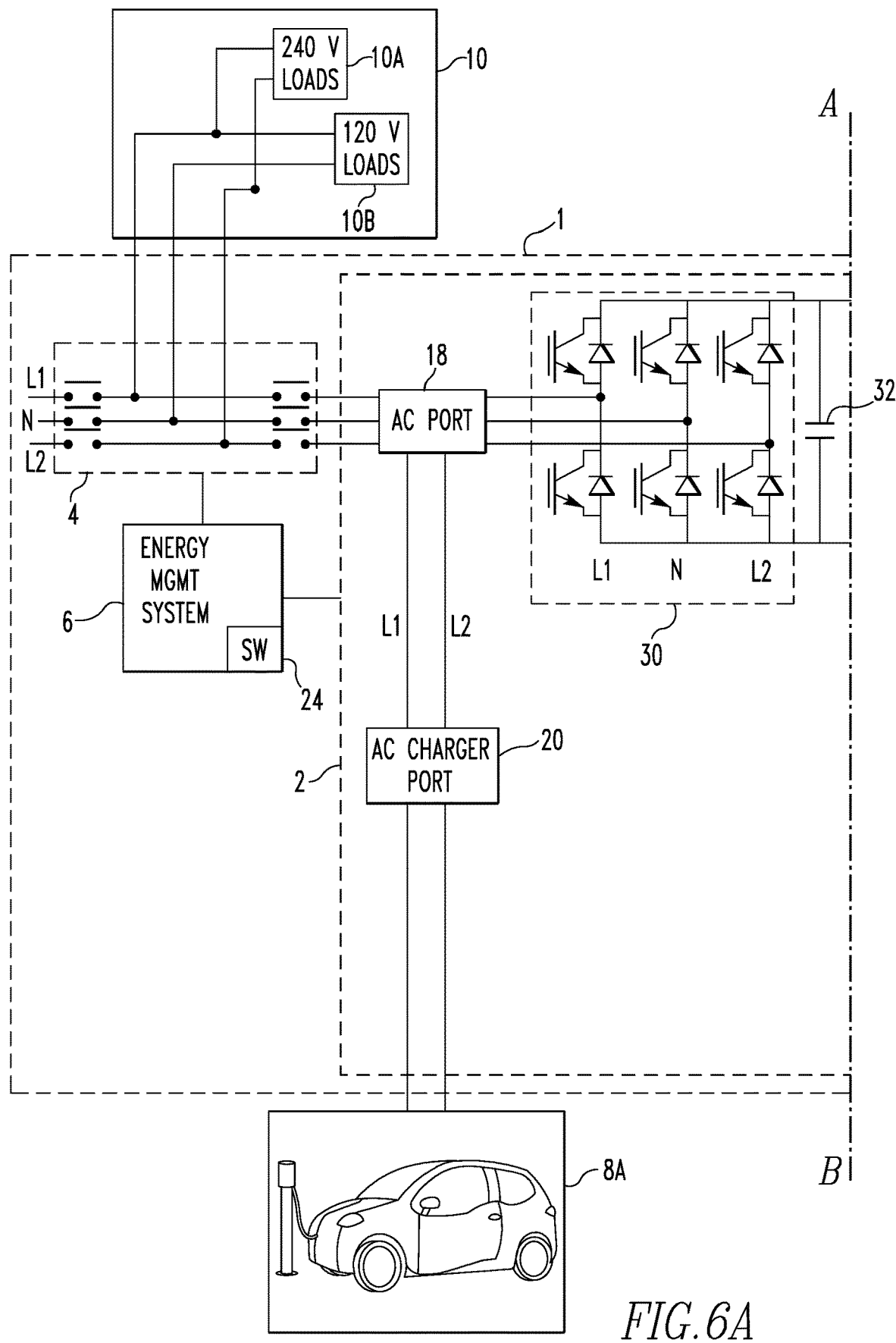
FIGS. 6A-B show a schematic diagram of a multi-port split-phase power system in accordance with an example embodiment of the disclosed concept.
Figure 6B:
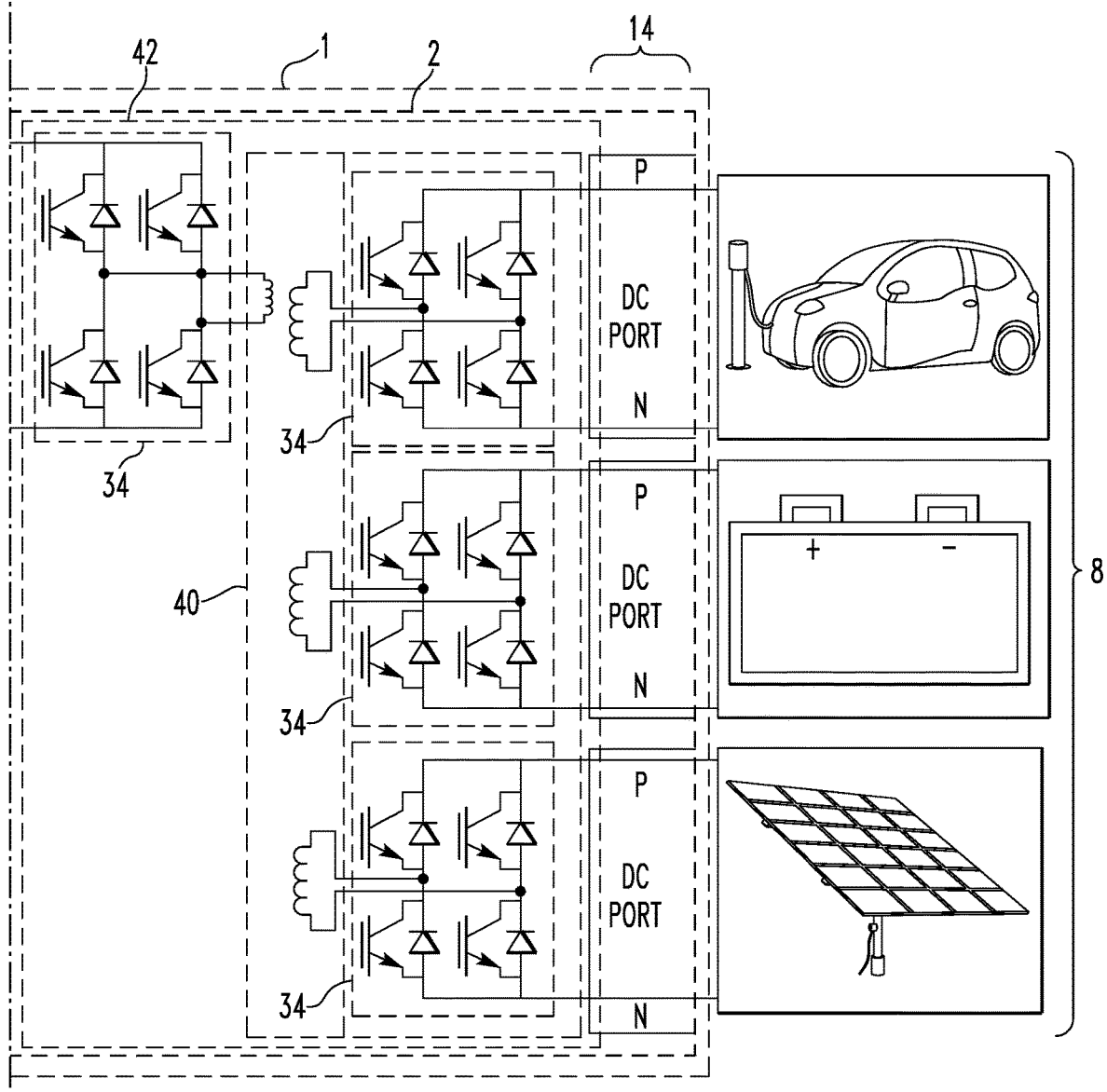

FIGS. 6A-B illustrate a schematic diagram of a multi-port split-phase power system 1 in accordance with an example embodiment of the disclosed concept. FIGS. 6A-B show the multi-port split-phase power system 1 coupled to the DC energy source devices 8 (e.g., an EV, an EV connected via a wireless DC EV charger, an energy storage battery system, PV) and an AC charger 8A (e.g., an EV, an EV connected via a wireless AC EV charger, a smart AC load that can also provide energy during islanding). The AC charger 8A is coupled to the AC port 18 and AC charger port 20. The AC port 18 is coupled to bidirectional DC to split phase AC converter, which is coupled to a DC bus capacitor 32. The AC charger 8A may be coupled to a breaker in a main or subpanel or inside the multi-port split-phase power system 1. The DC bus capacitor 32 is coupled to a bidirectional AC/DC converter 34, which is in turn coupled to high frequency transformer 40. The high frequency transformer 40 is coupled to one or more bidirectional AC/DC converters 34 that are in turn coupled to the DC ports 14 including a positive (+) and negative (−) voltage pins. The bidirectional AC/DC converters 34 and the high frequency transformer 40 form a DC/DC multi-port converter 42. The DC ports 14 are coupled to the DC energy sources 8. The bidirectional DC to split-phase AC converter 30 may include six MOSFETs, IGBTs or other switch types. The two left MOSFETs are connected to the first line L1, the middle two MOSFETs are connected to the neutral N, and the two right MOSFETs are connected to the second line L2, and are configured to receive DC voltages via the DC bus capacitor 32. The bidirectional AC/DC converters 34 may include four MOSFETs, IGBTs, or other switch types, and coupled to the high frequency transformer 40 to convert high frequency AC voltages from the transformer 40 to feed to the AC port 18 and the bidirectional DC to split-phase AC converter 34 via the DC capacitor bus 32. The bidirectional AC/DC converters 34 converts voltages (AC/DC) bidirectionally and the DC port 14 couples the DC energy source devices 8 to the bidirectional DC to split-phase AC converter 30 through multi-port DC/DC converter 42. The AC/DC converters 30 and DC/AC converters may be galvanically isolated. The AC port 18 and DC ports 14 may be also galvanically isolated. The DC energy source devices 8 and/or the AC charger 8A may be bidirectional devices, importing or exporting voltage from the utility 26 or to the load devices 10. The AC port 18 and the DC split-phase AC bidirectional converter 30 including L1, L2, and N conveniently and effectively support 120V and 240V load devices 10. L1, L2 and N are coupled to the load devices 10 via breakers 2, and L1 and L2 are coupled to the AC charger 8A. The load devices 10 include 240V devices 10A and 120V devices 10B. In operation, the AC charger 8A and/or DC sources 8 may provide 240V to 240V device 10A by closing breakers coupled to L1 and L2. The AC charger 8A and/or DC sources 8 may provide 120V to 120V device 10B by closing breakers coupled to L1 and N. The neutral N is provided by the AC port 18 and the bidirectional DC to split-phase AC converter 30. The number of MOSFETs for the converters 30 and 34 may not be limited to 6 and 4, respectively, and change depending on the circumstances and needs.

Figure 7A:
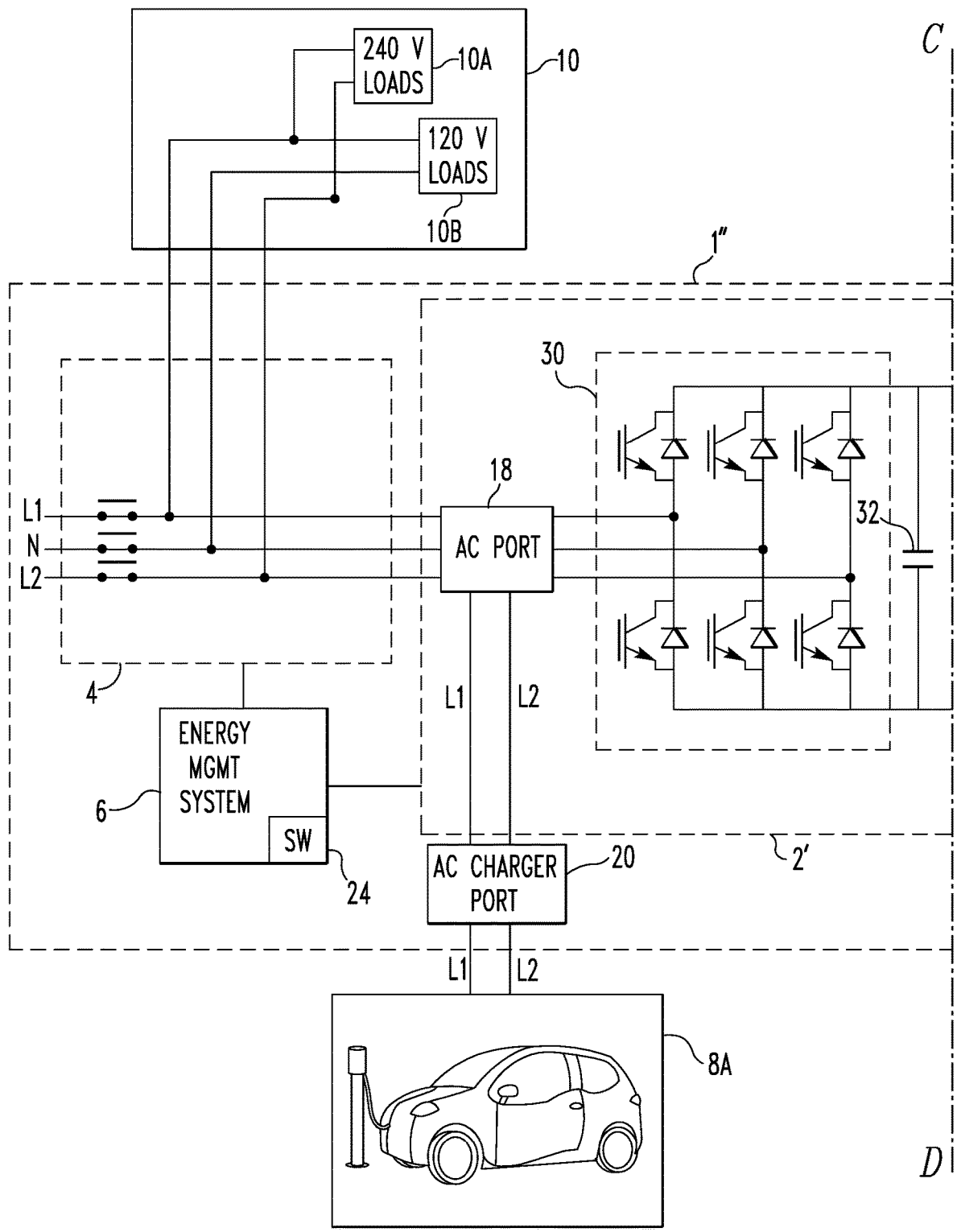
FIGS. 7A-B show a schematic diagram of a multi-port split-phase power system in accordance with an example embodiment of the disclosed concept.
Figure 7B:
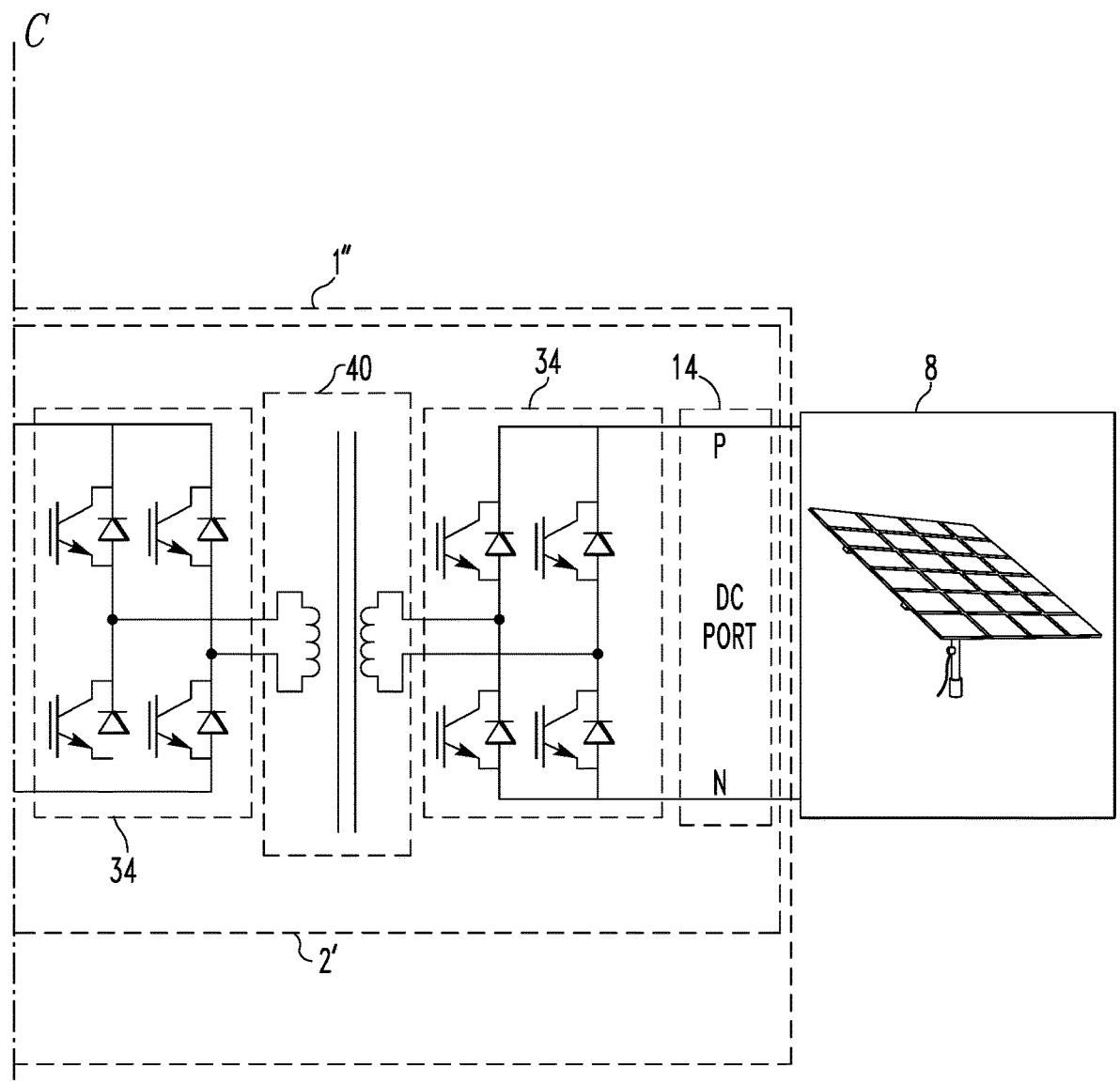

FIGS. 7A-B illustrate a schematic diagram of a multi-port split-phase power system 1" in accordance with an example embodiment of the disclosed concept. The multi-port split-phase power system 1" is similar to the multi-port split-phase power system 1,1' of FIGS. 1 and 2, except that the multi-port converter 2' includes a single DC port coupled to a DC energy source device (e.g., a PV) 8 in the islanded mode as the breaker 1 coupled to the utility 26 (not shown) are open. In FIGS. 7A-B, the PV 8 and/or the AC charger 8A may supply power to the load devices 10. If the PV 8 does not supply voltage to the load devices 10, then the AC/DC converter 18 provides the neutral (N) wire and the AC charger 8A may supply power to the 240V and 120 V loads via the AC port 18 and the DC split-phase AC bidirectional converter 30. The AC charger 8A may supply power to the 240V device 10A when the breakers coupled to the L1 and L2 are closed, and to the 120V device 10B when breakers coupled to L1 and N are closed.

Figure 8:
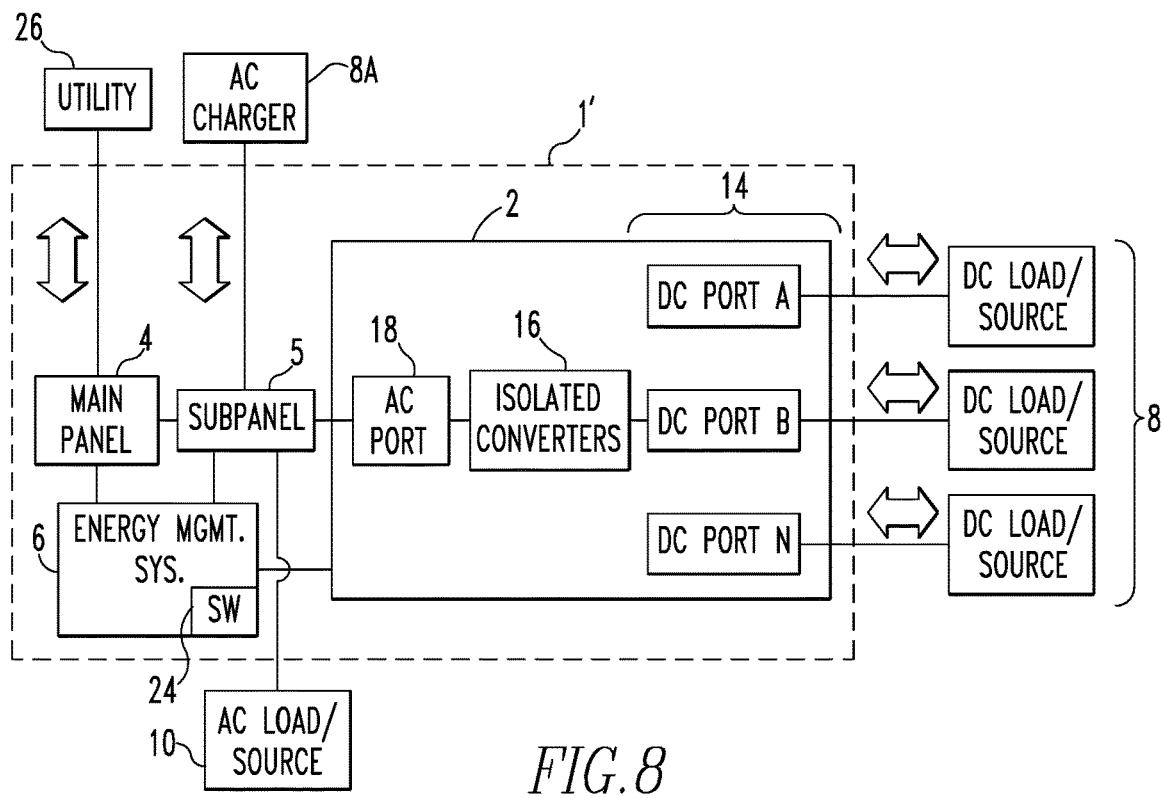
FIG. 8 is a block diagram of a multi-port split-phase power system in accordance with an example embodiment of the disclosed concept.

FIG. 8 is a block diagram of a multi-port split-phase power system 1' in accordance with an example embodiment of the disclosed concept. In FIG. 8, the multi-port split-phase power system 1' is connected to the utility electric grid. As such, the AC and DC load devices are fed from the utility 26, AC sources 10, AC bidirectional charger 8A and DC sources 8 or a combination of them. The power from each terminal may be varied with a sum of zero in the multi-port split-phase power system 1'.

Figure 9:
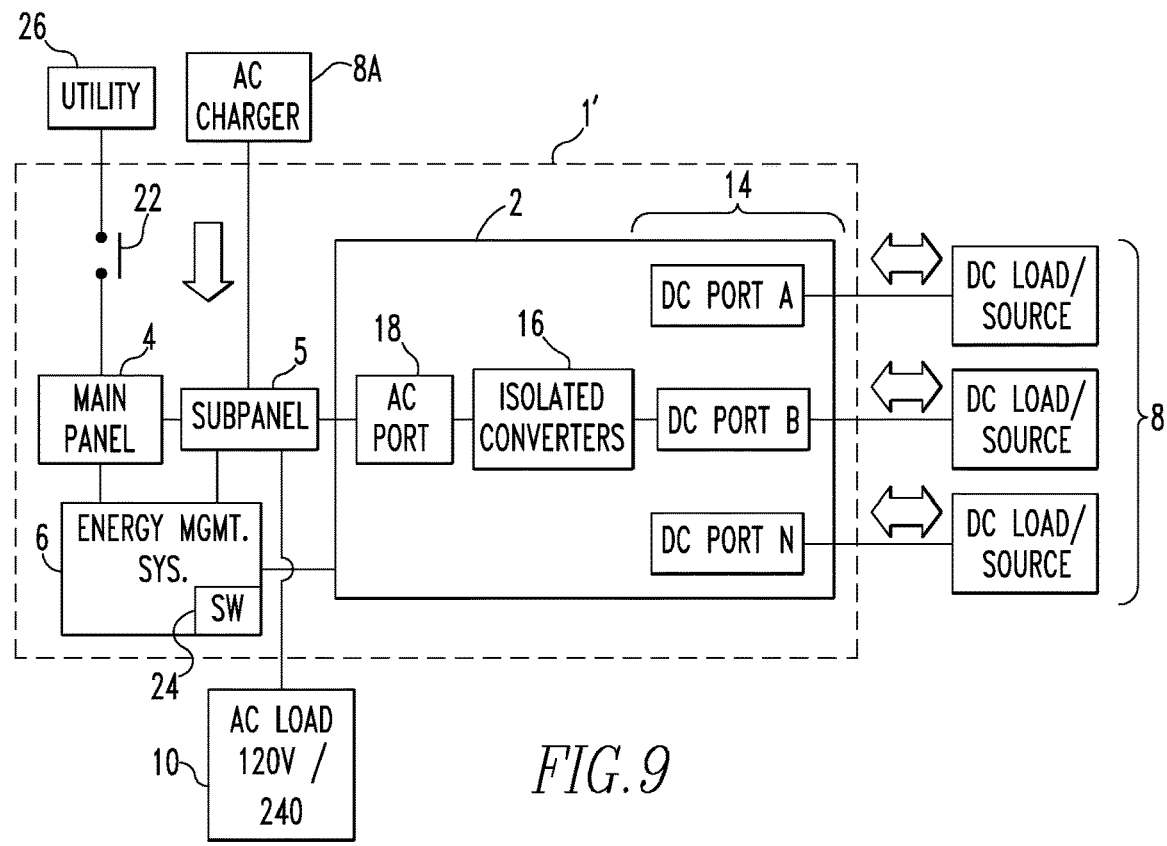
FIG. 9 is a block diagram of a multi-port split-phase power system in accordance with an example embodiment of the disclosed concept.
Figure 10:
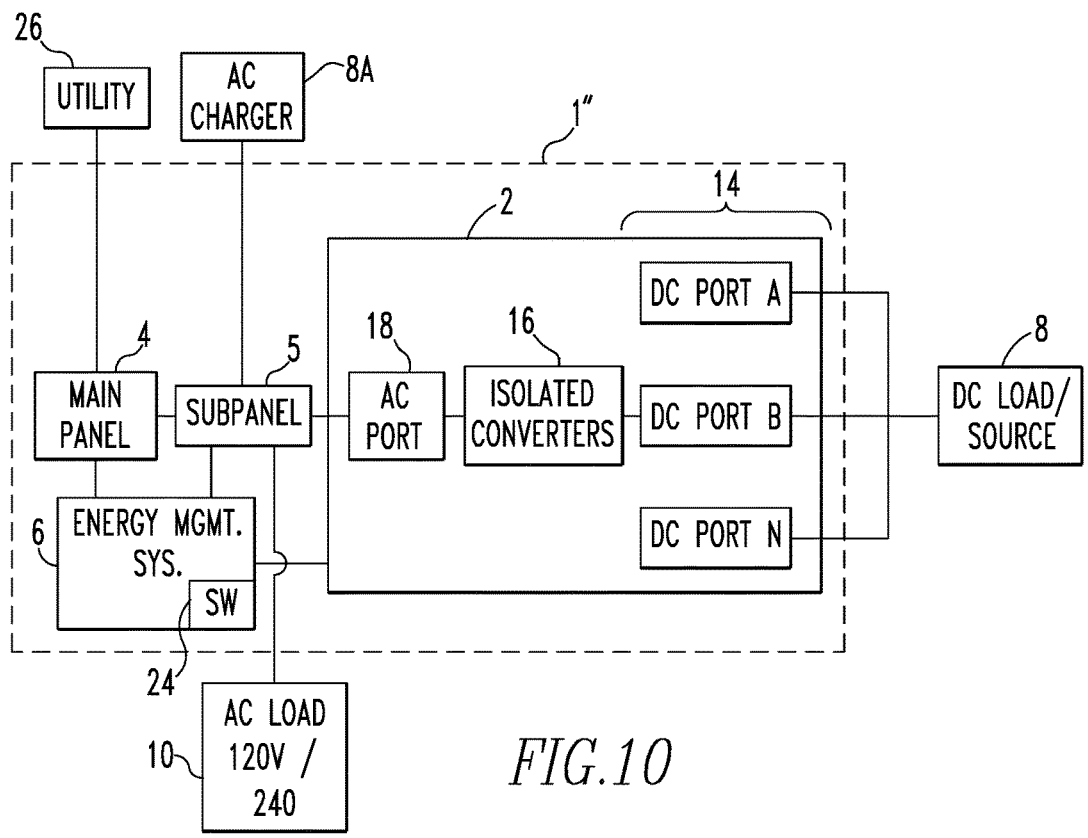
FIG. 10 is a block diagram of a multi-port split-phase power system in accordance with an example embodiment of the disclosed concept.

FIG. 9 is a block diagram of a multi-port split-phase power system 1' in accordance with an example embodiment of the disclosed concept. In FIG. 9, the multi-port split-phase power system 1' operates during islanded mode as the breaker 22 coupled to the utility 26 is open. That is, the multi-port split-phase power system 1' is not connected to the utility grid 26 and is islanded. The AC charger 8A is connected and possibly the AC charger 8A and the DC ports A, B, N 14 are providing power to the AC and DC loads. The AC charger 8A may be a unidirectional and/or bidirectional charger. If it is a bidirectional charger, it behaves as both a source and a load. If it is a unidirectional charger, it behaves as a load only. The load devices 10 include 120V and 240V devices. As such, a neutral is needed for the split-phase power system 1' and the AC loads 10. The neutral N is provided by the AC converter 16 and the AC port 18. FIG. 10 is a block diagram of a multi-port split-phase power system 1" in accordance with an example embodiment of the disclosed concept. The multi-port split-phase power system 1" is similar to the multi-port split-phase power system 1' of FIGS. 2, 5, 8, and 9, except that the multi-port converter 2 includes a plurality of DC ports 14 that are coupled to a single DC energy source device 8. That is, the DC port A, B and N 14 may be connected in parallel in different combinations to form various power levels of A+B+N, A+B, B+N+A or A+N+B. For example, if each of the DC ports A, B and N device 14 is rated to provide 10 kWh, then all of the DC ports connected in parallel may provide power up to 30 kWh.

Figure 11:
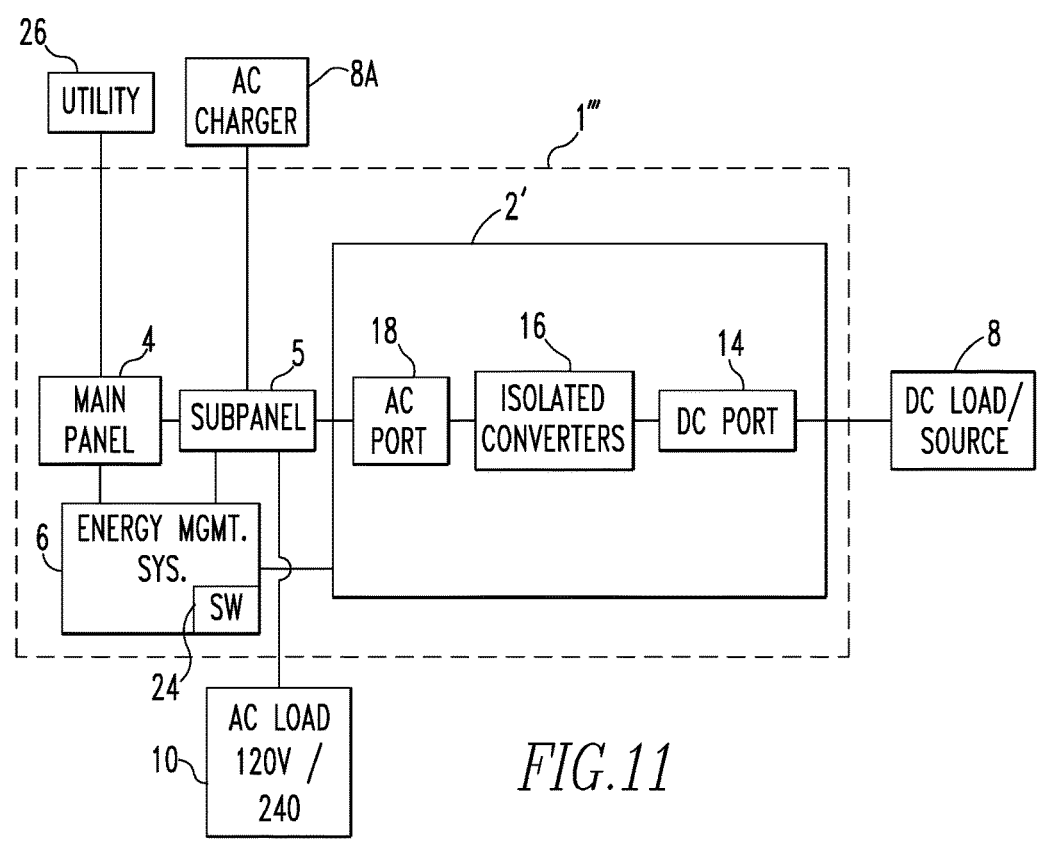
FIG. 11 is a block diagram of a multi-port split-phase power system in accordance with an example embodiment of the disclosed concept.

FIG. 11 is a block diagram of a multi-port split-phase power system 1''' in accordance with an example embodiment of the disclosed concept. The multi-port split-phase power system 1''' is similar to the multi-port split-phase power system 1' of FIGS. 2, 5, 7, 8, and 9, except that the multi-port converter 2' includes a single DC port 14 coupled to a single DC energy source or load device 8. As such, the number of the DC ports 14 may be varied.

Figure 12:
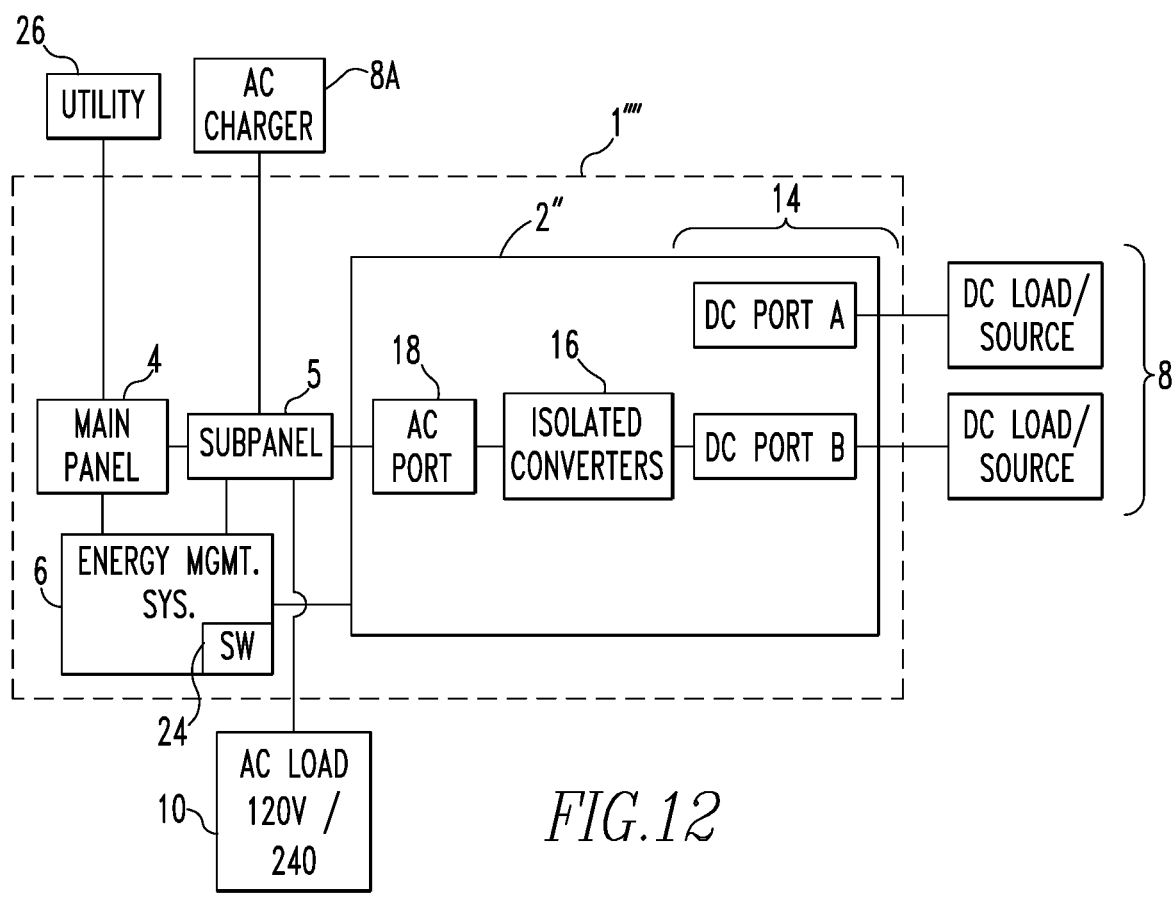
FIG. 12 is a block diagram of a multi-port split-phase power system in accordance with an example embodiment of the disclosed concept.

FIG. 12 is a block diagram of a multi-port split-phase power system $1^{iv}$ in accordance with an example embodiment of the disclosed concept. The multi-port split-phase power system $1^{iv}$ is similar to the multi-port split-phase power system with reference to FIGS. 2, 5, 8, and 9, except that the multi-port converter 2" includes two DC ports that are each coupled to a DC energy source or load device 8.

Figure 13:
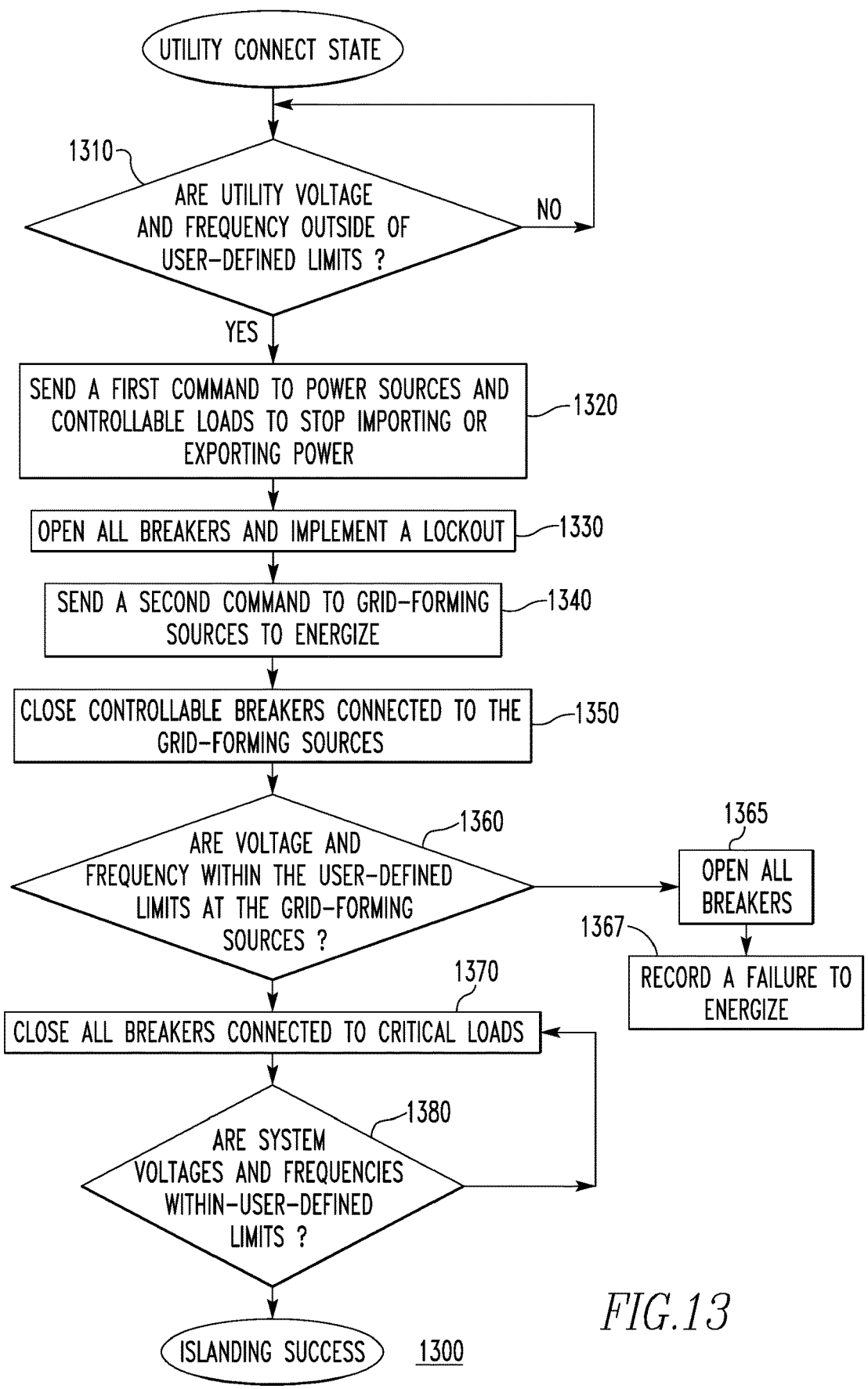
FIG. 13 illustrates a flow chart for method of islanding in accordance with an example embodiment of the disclosed concept.

FIG. 13 illustrates a flow chart for a method 1300 for islanding a multi-port split-phase power system in accordance with an example embodiment of the disclosed concept. The method 1300 may be performed by the multi-port split-phase system as described with FIGS. 1-12 or any component thereof.

At 1310, an energy management system of the multi-port split-phase power system determines whether utility voltage and frequency are outside of user-defined limits. The user-defined limits may be based on the local standards, user preferences, etc. If no, step 1310 is repeated. If yes, the method 1300 proceeds to 1320.

At 1320, the energy management system sends a first command to power sources and controllable loads to stop importing or exporting power. Power sources may include grid-forming sources (e.g., the energy source devices connected to an AC port, AC charger, DC source/load devices connected to a DC port, etc.), utility, etc. For example, the first command may direct the grid-forming energy source devices to stop importing power from the utility or exporting power to the multi-port split-phase power system.

At 1330, the energy management system opens all breakers and implements a lockout. For example, the lockout includes holding open a utility-facing breaker, and allowing all breakers coupled to the grid-forming energy sources devices that are supplying power during the islanded state to be closed.

At 1340, the energy management system sends a second command to the grid-forming sources to energize.

At 1350, the energy management system causes controllable breakers connected to the grid-forming sources to be closed. All breakers within the multi-port split-phase power system are controllable by the software within the energy management system.

At 1360, the energy management system determines whether voltage and frequency at the grid-forming sources are within the user defined limits. If no, at 1365 the energy management system causes to all breakers to be open, and at 1367 the energy management system records a failure to energize.

At 1370, the energy management system causes all breakers connected to critical loads to be closed. The critical loads may include furnace fan, a fan, a refrigerator, etc. A non-critical load may include, e.g., a TV.

At 1380, the energy management system determines whether system voltages and frequencies are within the user-defined limits. If no, the method 1300 returns to step 1370. If yes, the energy management system determines that an unplanned island has been completed successfully.

Figure 14A:
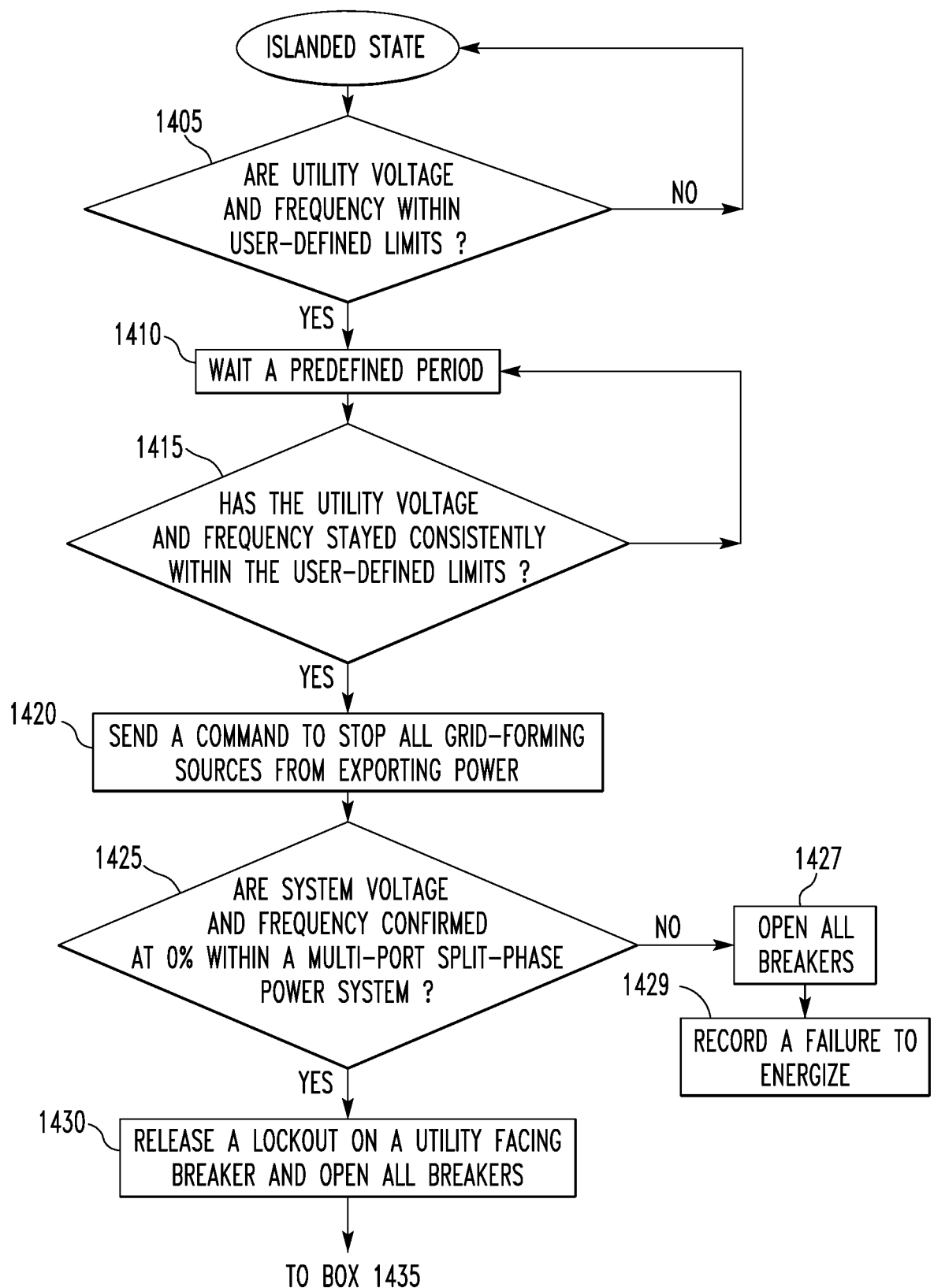
FIGS. 14A-B illustrate a flow chart for method of reconnecting to utility in accordance with an example embodiment of the disclosed concept.
Figure 14B:
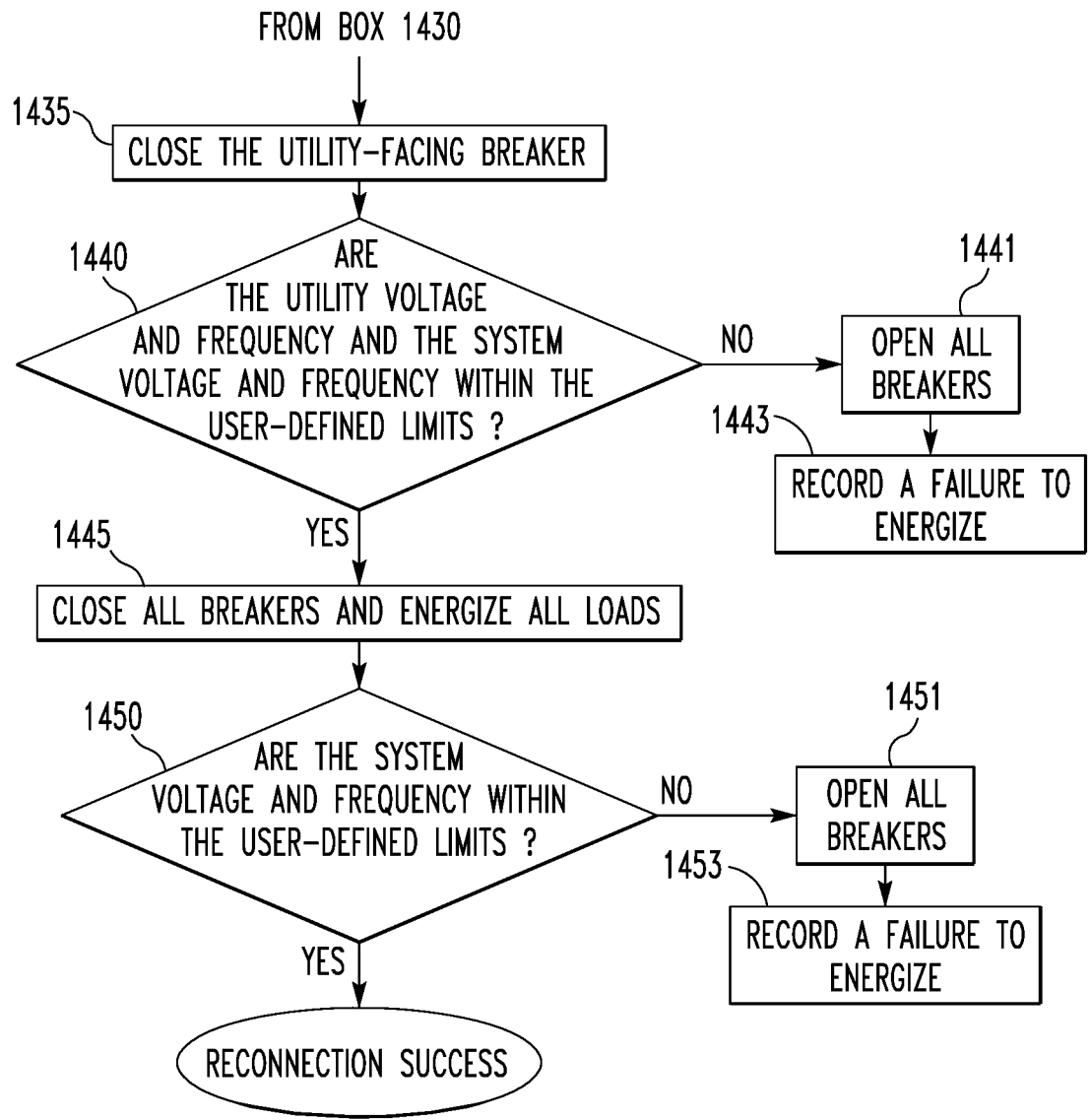

FIGS. 14A-B illustrate a flowchart for a method for unplanned reconnecting to the utility in accordance with an example embodiment of the disclosed concept. The method 1400 may be performed by the multi-port split-phase system as described with FIGS. 1-12 or any component thereof.

At 1405, the energy management system of the multi-port split-phase power system determines whether utility voltage and frequency are within user-defined limits. This step involves an unplanned reconnection to the utility, e.g., when the utility voltage and frequency returns to values within the user-defined limits. If it is determined that the utility voltage and frequency are not within the user defined limits, then the method returns to the islanded state. If yes, the method proceeds to 1410.

At 1410 the energy management system waits for a predefined period. The predefined period may be 300 seconds or a period determined as per local standards.

At 1415, the energy management system determines whether the utility voltage and frequency stayed consistently within the user-defined limits. If no, the method 1400 returns to 1410. If yes, the method 1400 proceeds to 1420.

At 1420, the energy management system sends a command to stop all grid-forming source converters from exporting power.

At 1425, the energy management system determines whether system voltage and frequency are confirmed at 0% within the multi-port split-phase power system. If no, at step 1427 the energy management system causes all breakers within the system to open, and at 1429 the energy management system records a failure to energize. If yes, the method 1400 proceeds to 1430. The system voltage and frequency may include any voltage and frequency measured at system buses.

At 1430, the energy management system releases a lockout on a utility-facing breaker and opens all breakers within the system.

At 1435, the energy management system closes the utility-facing breaker.

At 1440, the energy management system determines whether the utility voltage and frequency and the system voltage and frequency are within the user-defined limits. If no, at 1441 the energy management system opens all breakers within the system, and at 1443 the energy management system records a failure to energize. If yes, the method 1400 proceeds to 1445.

At 1445, the energy management system closes all breakers and energizes all loads.

At 1450, the energy management system determines whether the system voltage and frequency within the user-defined limits are within the user-defined limits. If no, at 1441 the energy management system opens all breakers within the system, and at 1443 the energy management system records a failure to energize. If yes, the energy management system determines that the unplanned reconnection to the utility has been completed successfully.

Figure 15:
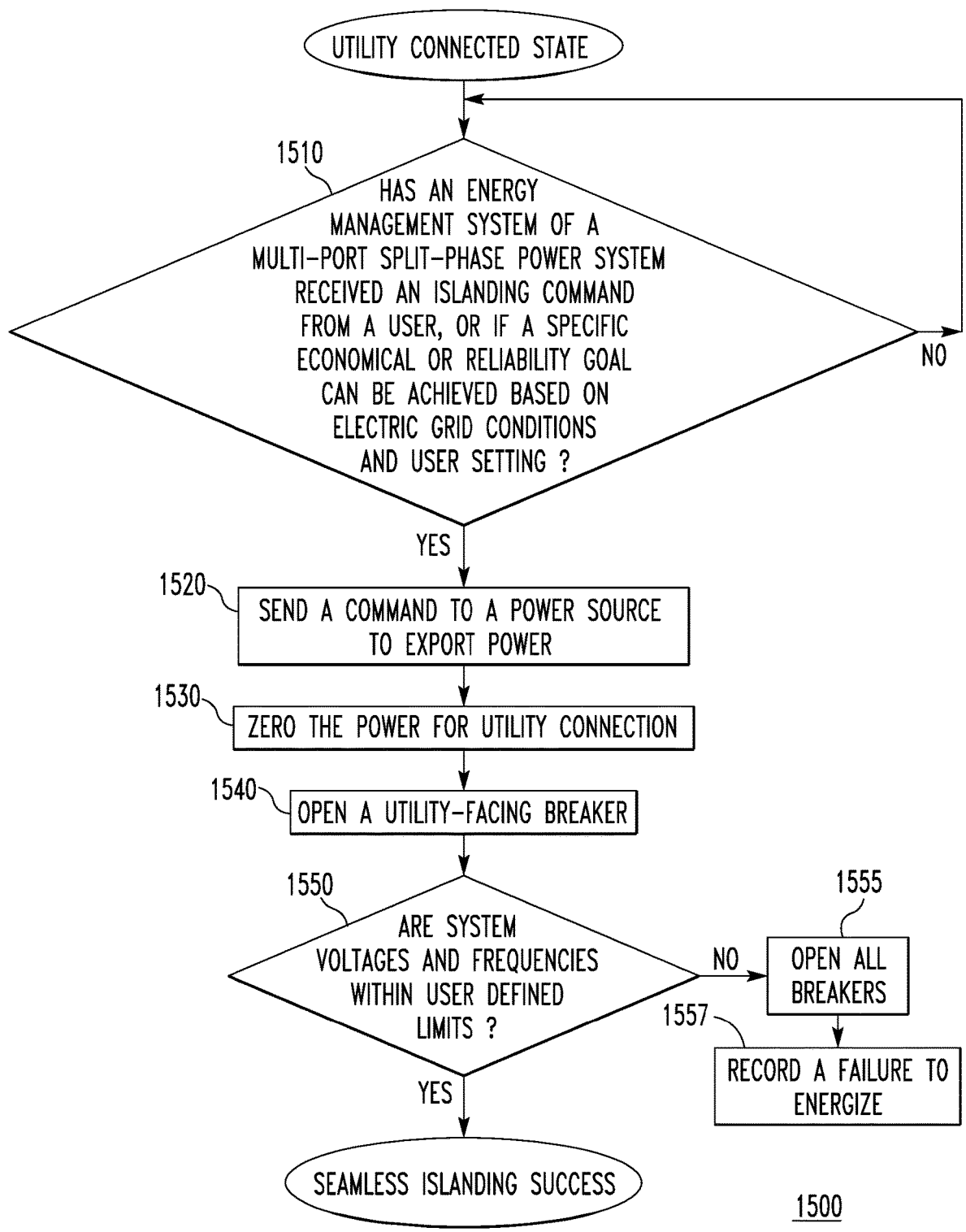
FIG. 15 is a flow chart for method of seamless islanding in accordance with an example embodiment of the disclosed concept.

FIG. 15 is a flowchart of a method 1500 for seamless islanding in accordance with an example embodiment of the disclosed concept. The method 1500 may be performed by the multi-port split-phase system as described with FIGS. 1-12 or any component thereof. The method 1500 involves a seamless islanding, e.g., a planned islanding at, e.g., a user's command.

At 1510, it is determined whether the energy management system of the multi-port split-phase power system has received an islanding command from a user, or if a specific economical or reliability goal can be achieved based on electric grid conditions and the user settings. If no, step 1510 is repeated. If yes, the method 1500 proceeds to 1520.

At 1520, the energy management system sends a command a power source to export power. The power source may include energy sources devices such as AC energy source devices (e.g., AC charger), DC sources/load devices, etc.

At 1530, the energy management system zeros the power for utility connection.

At 1540, the energy management system opens a utility-facing breaker.

At 1550, the energy management system determines whether system voltages and frequencies are within user-defined limits. If no, at 1555 the energy management system opens all breakers within the system, and at 1557 the energy management system records a failure to energize. If yes, the energy management system determines that the seamless islanding has been successfully completed.

Figure 16:
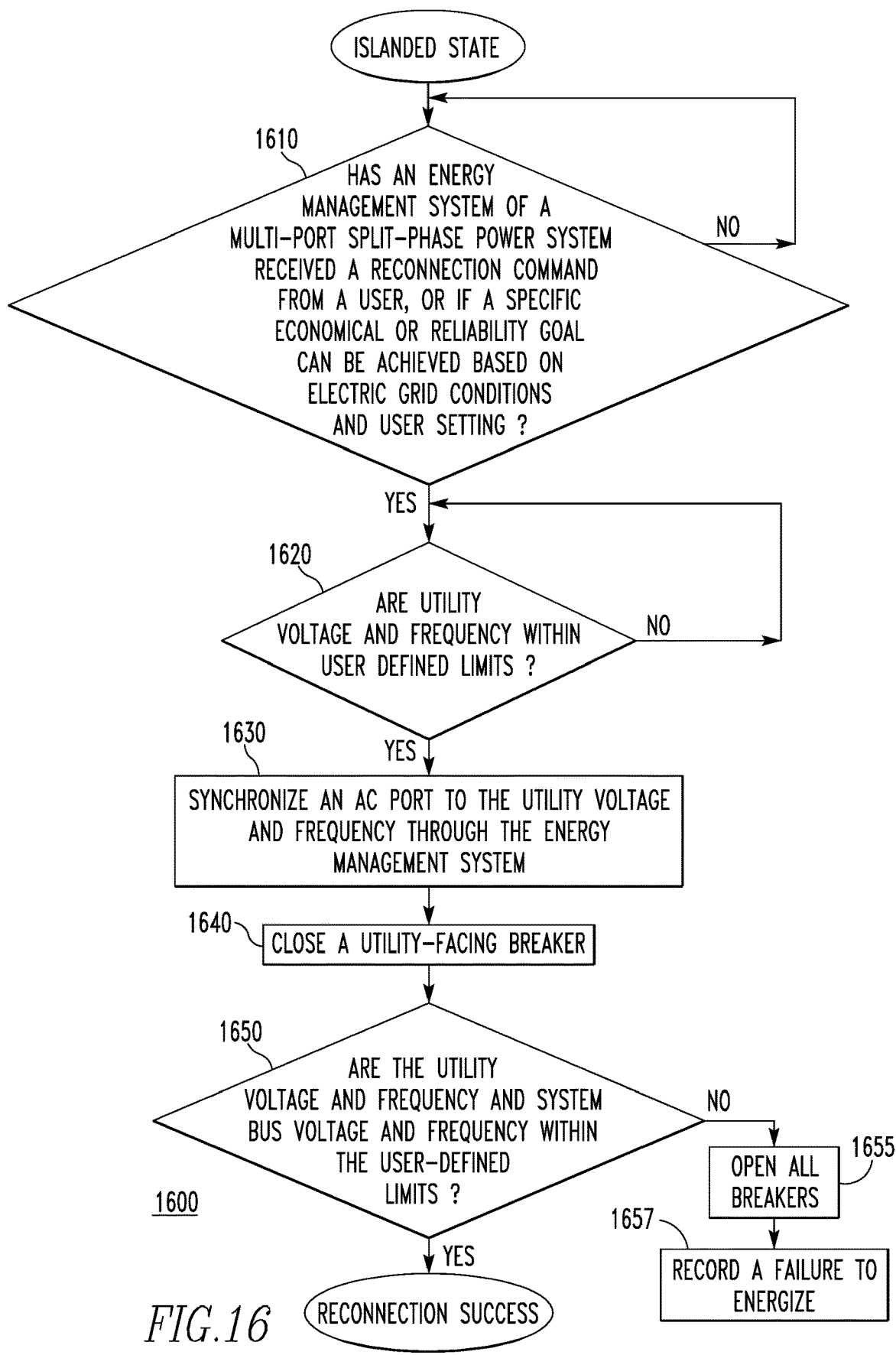
FIG. 16 is a flow chart for method of seamless reconnection in accordance with an example embodiment of the disclosed concept.

FIG. 16 is a flowchart for a method for seamless reconnecting to the utility in accordance with an example embodiment of the disclosed concept. The method 1600 may be performed by the multi-port split-phase system, or any component thereof, as described with FIGS. 1-12 or any component thereof.

At 1610, it is determined whether an energy management system of the multi-port split-phase power system has received a reconnection command from a user, or if a specific economical or reliability goal can be achieved based on electric grid conditions and user settings. If no, step 1610 is repeated. If yes, the method 1600 proceeds to 1620.

At 1620, the energy management system determines whether utility voltage and frequency are within user-defined limits. If no, step 1620 is repeated. If yes, the method 1600 proceeds to 1630.

At 1630, the energy management system synchronizes an AC port to the utility voltage and frequency.

At 1640, the energy management system closes a utility-facing breaker.

At 1650, the energy management system determines whether the utility and system bus voltage and frequency are within the user-defined limits. If no, at 1655 the energy management system opens all breakers within the multi-port split-phase power system, and at 1657 the energy management system records a failure to energize. If yes, the energy management system determines that the seamless reconnection has been completed successfully.

At 1640, the energy management system determines that the reconnection is successfully completed.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A multi-port split-phase power system for supplying power to a load device in an electric grid, comprising:
    a control panel comprising a plurality of breakers including a first breaker coupled to utility, a second breaker, a third breaker coupled to a bidirectional alternating current (AC) energy source device, and a fourth breaker coupled to the load device comprising critical load devices, wherein the bidirectional AC energy source device behaves as a load device when utility is coupled thereto and a power source during islanding, the bidirectional AC energy source device including a first line (L1) and a second line (L2) but not a neutral (N), such that the bidirectional AC energy source device does not have ability to provide power to a 120V load;
    a multi-port converter comprising an AC port coupled to the second breaker and the bidirectional AC energy source device, a DC port coupled to a DC energy source device, and galvanically isolated converters coupled to the AC port and DC port, the AC port comprising an L1, an L2 and an N, wherein the bidirectional AC energy source device supplies power to a 240V load when breakers coupled to the L1 and L2 are closed and to a 120V load when breakers coupled to L1 and N are closed during islanding; and
    a controller coupled to at least the multi-port converter, the control panel and the utility, the controller comprising a software stored therein, the controller being structured to at least control the multi-port split-phase power system, communicate with the utility, receive commands from the utility, detect a type of the DC energy source device, receive commands from the software, and perform islanding, reconnection to the utility, and interlocking of the plurality of breakers during islanding as per the commands from the software.

2. The multi-port split-phase power system of claim 1, wherein the bidirectional AC energy source device is solely capable of supplying power to the load device during islanding.

3. The multi-port split-phase power system of claim 1, wherein the DC energy source device is configured to import power from the utility for charging and export power to the electric grid and the multi-port split-phase power system.

4. The multi-port split-phase power system of claim 1, wherein, for islanding, the controller determines that utility voltage is low, and transmits a command to stop the load device, the bidirectional AC energy source device and the DC energy source device from importing or exporting power from or to the electric grid and the multi-port split-phase power system.

5. The multi-port split-phase power system of claim 4, wherein the controller is further structured to open the plurality of breakers based at least in part on the determination that utility voltage is low, and verify system voltage in the multi-port split-phase power system is zero.

6. The multi-port split-phase power system of claim 5, wherein the controller is further structured to lock out the first breaker by holding the first breaker open during islanding, and to interlock the first breaker and the second and third breaker at an inception of islanding.

7. The multi-port split-phase power system of claim 1, wherein islanding comprises a planned islanding or an unplanned islanding, the planned islanding occurring for reliability or economic purposes and the unplanned islanding occurring as a result of a power outage, the economic purposes associated with returning to and taking power from the electric grid.

8. The multi-port split-phase power system of claim 1, wherein islanding or reconnection is seamless.

9. The multi-port split-phase power system of claim 1, wherein, for reconnection, the controller determines that utility voltage in the multi-port split-phase power system is at 100% for a predefined period.

10. The multi-port split-phase power system of claim 9, wherein the controller is further structured to transmit a command to the load device, the bidirectional AC energy source device and the DC energy source device to stop importing or exporting power from or to the electric grid and the multi-port split-phase power system.

11. The multi-port split-phase power system of claim 10, wherein the controller releases a lockout for the first breaker coupled to the utility and opens the second breaker, the third breaker and the fourth breaker.

12. The multi-port split-phase power system of claim 11, wherein the controller closes the first breaker coupled to the utility and determines that the utility voltage and system voltage are at 100%.

13. The multi-port split-phase power system of claim 12, wherein the controller closes the second breaker, the third breaker, and the fourth breaker to energize the load device from the utility.

14. The multi-port split-phase power system of claim 1, wherein the bidirectional AC energy source device comprises an electric vehicle (EV), an EV connected via a wireless AC EV charger, or a smart AC device.

15. The multi-port split-phase power system of claim 1, wherein the DC port is configured by the software in the controller to be used with any type of the DC energy source device, comprising an electric vehicle (EV), a solar panel, a battery energy storage system, an EV connected via a wireless DC EV charger, or a smart DC device.

16. The multi-port split-phase power system of claim 1, wherein the control panel comprises at least one of a main panel or a subpanel, the subpanel coupled to the main panel and the critical load devices.

17. The multi-port split-phase power system of claim 1, wherein the electric grid is installed at a single-family residence, multi-family residences, or a small commercial business.

18. The multi-port split-phase power system of claim 1, wherein the bidirectional AC energy source device and the DC energy source device transfer energy bidirectionally.

19. A method for an unplanned islanding, comprising:
providing a multi-port split-phase power system that comprises: (i) a control panel comprising a plurality of breakers including a first breaker coupled to utility, a second breaker, a third breaker coupled to a bidirectional alternating current (AC) energy source device, and a fourth breaker coupled to the load device comprising critical load devices, wherein the bidirectional AC energy source device behaves as a load device when utility is coupled thereto and a power source during islanding, the bidirectional AC energy source device including a first line (L1) and a second line (L2) but not a neutral (N), such that the bidirectional AC energy source device does not have ability to provide power to a 120V load; (ii) a multi-port converter comprising an AC port coupled to the second breaker and the bidirectional AC energy source device, a DC port coupled to a DC energy source device, and galvanically isolated converters coupled to the AC port and DC port, the AC port comprising an L1, an L2 and an N, wherein the bidirectional AC energy source device supplies power to a 240V load when breakers coupled to the L1 and L2 are closed and to a 120V load when breakers coupled to L1 and N are closed during islanding; and (iii) a controller coupled to at least the multi-port converter, the control panel and the utility, the controller comprising a software stored therein, the controller being structured to at least control the multi-port split-phase power system, communicate with the utility, receive commands from the utility, detect a type of the DC energy source device, receive commands from the software, and perform islanding, reconnection to the utility, and interlocking of the plurality of breakers during islanding as per the commands from the software;
determining that utility voltage and frequency are outside of user-defined limits;
sending a first command to a grid-forming energy source device and a controllable load device to stop from importing or exporting power;
open all breakers of a plurality of breakers within the multi-port split-phase power system and implement a lockout, the plurality of breakers are controllable by a software stored within an energy management system of the multi-port split-phase power system, wherein the lockout comprises holding a first breaker coupled to utility open;
sending a second command to the grid-forming energy source devices to energize;
closing a second breaker coupled to the grid-forming energy source devices;
determining that source voltage and frequency at the grid-forming energy source devices are within the user-defined limits;
closing a third breaker coupled to critical loads; and
determining that system voltage and frequency are within the user-defined limits.

20. A method of unplanned reconnection to an electric grid, comprising:
providing a multi-port split-phase power system that comprises: (i) a control panel comprising a plurality of breakers including a first breaker coupled to utility, a second breaker, a third breaker coupled to a bidirectional alternating current (AC) energy source device, and a fourth breaker coupled to the load device comprising critical load devices, wherein the bidirectional AC energy source device behaves as a load device when utility is coupled thereto and a power source during islanding, the bidirectional AC energy source device including a first line (L1) and a second line (L2) but not a neutral (N), such that the bidirectional AC energy source device does not have ability to provide power to a 120V load; (ii) a multi-port converter comprising an AC port coupled to the second breaker and the bidirectional AC energy source device, a DC port coupled to a DC energy source device, and galvanically isolated converters coupled to the AC port and DC port, the AC port comprising an L1, an L2 and an N, wherein the bidirectional AC energy source device supplies power to a 240V load when breakers coupled to the L1 and L2 are closed and to a 120V load when breakers coupled to L1 and N are closed during islanding; and (iii) a controller coupled to at least the multi-port converter, the control panel and the utility, the controller comprising a software stored therein, the controller being structured to at least control the multi-port split-phase power system, communicate with the utility, receive commands from the utility, detect a type of the DC energy source device, receive commands from the software, and perform islanding, reconnection to the utility, and interlocking of the plurality of breakers during islanding as per the commands from the software;
determining that utility voltage and frequency are within user-defined limits;
waiting a predefined period;
determining that the utility voltage and frequency stayed consistently within the user-defined limits during the predefined period;
sending a command to all grid-forming energy source devices to stop exporting power to the multi-port split-phase power system;
determining that system voltage and frequency are at 0% within the multi-port split-phase power system;
releasing a lockout on a first breaker coupled to utility and opening all breakers within the multi-port split-phase power system;
closing the first breaker coupled to the utility;
determining that the utility voltage and frequency and system voltage and frequency are within the user-defined limits;
closing all breakers and energizing all loads; and
determining that the system voltage and frequency are within the user-defined limits.

21. A method for seamless islanding, comprising:
providing a multi-port split-phase power system that comprises: (i) a control panel comprising a plurality of breakers including a first breaker coupled to utility, a second breaker, a third breaker coupled to a bidirectional alternating current (AC) energy source device, and a fourth breaker coupled to the load device comprising critical load devices, wherein the bidirectional AC energy source device behaves as a load device when utility is coupled thereto and a power source during islanding, the bidirectional AC energy source device including a first line (L1) and a second line (L2) but not a neutral (N), such that the bidirectional AC energy source device does not have ability to provide power to a 120V load; (ii) a multi-port converter comprising an AC port coupled to the second breaker and the bidirectional AC energy source device, a DC port coupled to a DC energy source device, and galvanically isolated converters coupled to the AC port and DC port, the AC port comprising an L1, an L2 and an N, wherein the bidirectional AC energy source device supplies power to a 240V load when breakers coupled to the L1 and L2 are closed and to a 120V load when breakers coupled to L1 and N are closed during islanding; and (iii) a controller coupled to at least the multi-port converter, the control panel and the utility, the controller comprising a software stored therein, the controller being structured to at least control the multi-port split-phase power system, communicate with the utility, receive commands from the utility, detect a type of the DC energy source device, receive commands from the software, and perform islanding, reconnection to the utility, and interlocking of the plurality of breakers during islanding as per the commands from the software;

determining that an energy management system has received an islanding command;

sending a command to a grid-forming energy source device to export power to the multi-port split-phase power system;

zeroing the power for utility connection;

opening a first breaker coupled to utility; and determining that system voltage and frequency are within user-defined limits.

22. A method for a seamless reconnection to an electric grid, comprising:

providing a multi-port split-phase power system that comprises: (i) a control panel comprising a plurality of breakers including a first breaker coupled to utility, a second breaker, a third breaker coupled to a bidirectional alternating current (AC) energy source device, and a fourth breaker coupled to the load device comprising critical load devices, wherein the bidirectional AC energy source device behaves as a load device when utility is coupled thereto and a power source during islanding, the bidirectional AC energy source device including a first line (L1) and a second line (L2) but not a neutral (N), such that the bidirectional AC energy source device does not have ability to provide power to a 120V load; (ii) a multi-port converter comprising an AC port coupled to the second breaker and the bidirectional AC energy source device, a DC port coupled to a DC energy source device, and galvanically isolated converters coupled to the AC port and DC port, the AC port comprising an L1, an L2 and an N, wherein the bidirectional AC energy source device supplies power to a 240V load when breakers coupled to the L1 and L2 are closed and to a 120V load when breakers coupled to L1 and N are closed during islanding; and (iii) a controller coupled to at least the multi-port converter, the control panel and the utility, the controller comprising a software stored therein, the controller being structured to at least control the multi-port split-phase power system, communicate with the utility, receive commands from the utility, detect a type of the DC energy source device, receive commands from the software, and perform islanding, reconnection to the utility, and interlocking of the plurality of breakers during islanding as per the commands from the software;

determining that an energy management system of the multi-port split-phase power system has received a reconnection command;

determining that utility voltage and frequency are within user-defined limits;

synchronizing an AC port of the multi-port split-phase power system to the utility voltage and frequency;

closing a first breaker coupled to utility; and determining that the utility voltage and frequency and system voltage and frequency are within the user-defined limits.

\* \* \* \* \*